US011244413B2

(12) United States Patent
Lee et al.

(10) Patent No.: US 11,244,413 B2
(45) Date of Patent: Feb. 8, 2022

(54) METHOD AND SYSTEM FOR EQUITY SHARING OF A REAL ESTATE PROPERTY

(71) Applicant: Zeehaus Inc., San Francisco, CA (US)

(72) Inventors: Justin Lee, San Francisco, CA (US);
Abhijeet Misra, Lucknow (IN);
Prateek Gupta, Lucknow (IN)

(73) Assignee: Zeehaus Inc., San Francisco, CA (US)

(*) Notice: Subject to any disclaimer, the term of this patent is extended or adjusted under 35 U.S.C. 154(b) by 39 days.

(21) Appl. No.: 15/920,241

(22) Filed: Mar. 13, 2018

(65) Prior Publication Data

US 2019/0287195 A1 Sep. 19, 2019

(51) Int. Cl.
*G06Q 50/16* (2012.01)
*G06Q 40/04* (2012.01)
*G06Q 20/36* (2012.01)

(52) U.S. Cl.
CPC .......... *G06Q 50/167* (2013.01); *G06Q 20/36* (2013.01); *G06Q 40/04* (2013.01)

(58) Field of Classification Search
CPC ........ G06Q 40/06; G06Q 50/16; G06Q 40/00; G06Q 40/025; G06Q 40/04; G06Q 50/167; G06Q 20/36
See application file for complete search history.

(56) References Cited

U.S. PATENT DOCUMENTS

| | | | | |
|---|---|---|---|---|
| 7,130,825 | B2 * | 10/2006 | Vlahoplus | ............ G06Q 30/06 705/37 |
| 7,516,099 | B2 | 4/2009 | Schneider et al. | |
| 8,219,471 | B2 | 7/2012 | Abuaf | |
| 10,504,179 | B1 * | 12/2019 | McGuire | ............... G06Q 40/04 |
| 2005/0108029 | A1 | 5/2005 | Schneider | |
| 2005/0108123 | A1 * | 5/2005 | Schneider | .......... G06Q 30/0613 705/35 |
| 2006/0248000 | A1 * | 11/2006 | Graeve | ............... G06Q 40/025 705/38 |

(Continued)

FOREIGN PATENT DOCUMENTS

WO  WO-2008103901 A  *  8/2008  ............. G06Q 50/16

OTHER PUBLICATIONS

Amy Whitaker and Roman Kräussl. Blockchain, Fractional Ownership, and the Future of Creative Work. Management Science, orbilu.uni.lu. (Jan. 2018, Revised Feb. 2019). (Year: 2018).*

*Primary Examiner* — Virpi H Kanervo
(74) *Attorney, Agent, or Firm* — Kanika Radhakrishnan; Evergreen Valley Law Group

(57) ABSTRACT

A method for equity sharing of a property, equity sharing of a property, the method including: receiving details of a property inputted by a user; short listing the property for funding once score of the property is greater than a threshold; dividing the property into a plurality of equity shares, wherein each equity share indicates a fraction of ownership of the property; determining equity rate, wherein the equity rate is rate for each equity share; receiving an input from an investor searching for the property; providing option to the investor to purchase one or more equity shares; receiving indication of number of equity shares to be purchased by the investor; determining amount to be paid by the investor based on number of equity shares and the equity rate; transferring the amount to a trust; and storing ownership data including fractional ownership of the investor based on number of equity shares purchased by the investor.

22 Claims, 34 Drawing Sheets

(56) References Cited

U.S. PATENT DOCUMENTS

| | | |
|---|---|---|
| 2007/0038533 A1 | 2/2007 | Huff |
| 2008/0046353 A1* | 2/2008 | Poltorak ................ G06Q 40/04 |
| | | 705/37 |
| 2008/0168004 A1* | 7/2008 | Kagarlis ................ G06Q 40/06 |
| | | 705/36 R |
| 2010/0185467 A1 | 7/2010 | Strnad, II |
| 2010/0293114 A1 | 11/2010 | Khan et al. |
| 2015/0081497 A1* | 3/2015 | Patel ...................... G06Q 50/16 |
| | | 705/35 |
| 2016/0042452 A1 | 2/2016 | Giudilli |
| 2016/0093007 A1* | 3/2016 | Richardson ........ G06Q 30/0611 |
| | | 705/80 |
| 2016/0224621 A1* | 8/2016 | Bousquet ............ G06F 16/9535 |
| 2017/0048235 A1 | 2/2017 | Lohe et al. |
| 2017/0161855 A1* | 6/2017 | Schreyer .............. G06Q 50/167 |
| 2017/0213289 A1 | 7/2017 | Doney |
| 2017/0249606 A1* | 8/2017 | Pirooz .................... G06Q 40/02 |
| 2018/0060981 A1* | 3/2018 | Sher ...................... G06Q 50/163 |
| 2019/0266672 A1* | 8/2019 | Hill ........................ G06Q 40/06 |

\* cited by examiner

≡ P PORTAL | ⊙ PROPERTY LISTING | ⊙ PROPERTY OFFER | ⊙ FUNDING TERMS | ⊙ CLOSING CHECKLIST

ISSUER HOME

FUNDING STATUS

PORTFOLIO

BANK ACCOUNTS

ACTIVITY HISTORY

MY ACCOUNTS

REFERRALS

PROPERTY LISTING INFORMATION
THIS INFORMATION WILL HELP US TO EVALUATE THE PROPERTY QUALIFICATION

ADDRESS INFORMATION (PLEASE VALIDATE DETAILS FROM FULL ADDRESS AUTOCOMPLETE)
FULL ADDRESS
PROPERTY FULL ADDRESS

APARTMENT NUMBER (OPTIONAL)                STREET NUMBER (OPTIONAL)

STREET ADDRESS / ADDRESS LINE 1            STREET ADDRESS / ADDRESS LINE 2
PROPERTY STREET ADDRESS LINE 1             PROPERTY STREET ADDRESS LINE 2

CITY                          STATE              POSTAL CODE
PROPERTY CITY                 CA                 111111

COUNTRY                       COUNTRY            NEIGHBORHOOD
PROPERTY COUNTRY              US                 DOWNTOWN

LISTING INFORMATION
LEGAL DESCRIPTION 1
PROPERTY LEGAL DESCRIPTION 1

MARKET CONDITIONS

MEDIAN PRICE

| BLOCK GROUP | ZIP CODE |
|---|---|
| CURRENT MEDIAN PRICE | $656,807.0 |
| PRICE PER SQ FT | $465.7 |

DAYS ON MARKET  115
MONTHS OF SUPPLY  35
RISK OF DECLINE  7.7%
RISK SCORE  VERY_LOW

PROPERTY PERFORMANCE

HISTORIC ANNUAL APPRECIATION   MSA

| COMPOUND GROWTH RATE | CUMULATIVE GROWTH RATE |
|---|---|
| 1 YR HIST RETURN | 1 YR TOTAL RETURN |
| 7.0% | 7.0% |
| 5 YR HIST RETURN | 5 YR TOTAL RETURN |
| 10.0% | 60.0% |
| 10 YR HIST RETURN | 10 YR TOTAL RETURN |
| -1.0% | -13.0% |
| 20 YR HIST RETURN | 20 YR TOTAL RETURN |
| 4.0% | 137.0% |

FORECAST PRICE CHANGE

| PROPERTY FORECAST | ZIP CODE FORECAST |
|---|---|
| GROWTH YR 1 % | |
| 5.18 | |
| GROWTH YR 2 % | |
| 0.57 | |
| GROWTH YR 3 % | |
| -1.26 | |

ESTIMATE TOTAL RETURN

CASH FLOW AND TOTAL RETURN ○

NUMBER OF SHARES
10
|
1

| | |
|---|---|
| PROJECTED ANNUAL INCOME | 92 |
| TOTAL PROJECTED INCOME | $4,060 |
| NET INCOME | $2,260 |
| TOTAL EXPENSES | |
| GROSS RATE OF RETURN | 5.07% |
| NET RATE OF RETURN | 2.75% |
| TAXABLE INCOME ○ | $455 |
| NET IRR ○ | 6.75% |

RETURN AT END OF CONTRACT

| | |
|---|---|
| INVESTMENT AMOUNT | $80,000 |
| CONTRACT TERM (MONTHS) | 60 |
| TOTAL $ RETURN | $99,852 |
| IMPROVEMENT OVER TOTAL VALUE ○ | |
| ESTIMATED IMPROVEMENT VALUE | $48,000 |
| ESTIMATED LAND VALUE | $32,000 |
| IMPROVEMENT / TOTAL VALUE | 60.0% |

FORECAST CUMULATIVE APPRECIATION ○

FIRST NAME
ABCD

MIDDLE NAME

LAST NAME
XYZ

FULL PROPERTY ADDRESS
241 10TH STREET, SAN FRANCISCO, CA, UNITED STATES

INVESTMENT AMOUNT COMMITTED
104000.0

WILLING TO COOPERATE 1031? ⓘ

● YES          ○ NO

REQUEST 1031-EXCHANGE

TODAY'
2018-01-21

[ AGREE ]  [ CANCEL AND EXIT ]

METHOD AND SYSTEM FOR EQUITY SHARING OF A REAL ESTATE PROPERTY

TECHNICAL FIELD

Embodiments of the disclosure relate generally to equity sharing of a real estate property, and more particularly, to a method and system that allows an individual to purchase and sell fractional real estate property using equity sharing.

BACKGROUND

Since the year 2008 subprime housing crisis, guidelines for qualifying for conventional debt financing have tightened considerably. Since that time, real estate property values have recovered significantly. Combining tight credit availability and high property value, the real estate market condition is putting homeownership out of reach for many prospective home buyers (also referred to as buyers). Obtaining debt or mortgage financing and competing with other buyers is a difficult and stressful process for many people looking to be homeowners or even for people looking for rental investment property.

Another issue many prospective buyers face is the bidding war that is making it very difficult to buy the property, even for buyers who are qualified for debt financing, since they have a difficult time competing with buyers who are using all cash or large down payment, and can close quickly. Additionally, it is also a stressful process for buyers to figure out what is the right price to pay for a property, while going through all the challenges of the home buying and financing process.

In light of the above discussion, there exists a need for a method and a system that allows an individual to purchase the real estate property using equity sharing.

SUMMARY

The principal objective of the embodiments herein is to provide a method and a system that allows an individual to purchase and sell fractional real estate property using equity sharing.

A method for equity sharing of a property is provided, the method including: receiving details of a property inputted by a user; short listing the property for funding once score of the property is greater than a threshold; dividing the property into a plurality of equity shares, wherein each equity share indicates a fraction of ownership of the property; determining equity rate, wherein the equity rate is rate for each equity share; receiving an input from an investor searching for the property; providing option to the investor to purchase one or more equity shares; receiving indication of number of equity shares to be purchased by the investor; determining amount to be paid by the investor based on number of equity shares and the equity rate; transferring the amount to a trust; and storing ownership data including fractional ownership of the investor based on number of equity shares purchased by the investor.

A system including a memory for storing instructions; and a processor for performing, in response to the stored instructions, a method for equity sharing of a property is provided. The method includes receiving details of a property inputted by a user, short listing the property for funding once score of the property is greater than a threshold, dividing the property into a plurality of equity shares, wherein each equity share indicates a fraction of ownership of the property, determining equity rate, wherein the equity rate is rate for each equity share, receiving an input from an investor searching for the property, providing option to the investor to purchase one or more equity shares, receiving indication of number of equity shares to be purchased by the investor, determining amount to be paid by the investor based on number of equity shares and the equity rate, transferring the amount to a trust, and storing ownership data including fractional ownership of the investor based on number of equity shares purchased by the investor.

These and other aspects of the embodiments herein will be better appreciated and understood when considered in conjunction with the following description and the accompanying drawings. It should be understood, however, that the following description, while indicating preferred embodiments and numerous specific details thereof, are given by way of illustration and not of limitation. Many changes and modifications may be made within the scope of the embodiments herein without departing from the spirit thereof, and the embodiments herein include all such modifications.

BRIEF DESCRIPTION OF THE VIEWS OF DRAWINGS

In the accompanying figures, similar reference numerals may refer to identical or functionally similar elements. These reference numerals are used in the detailed description to illustrate various embodiments and to explain various aspects and advantages of the present disclosure.

Figure 6:
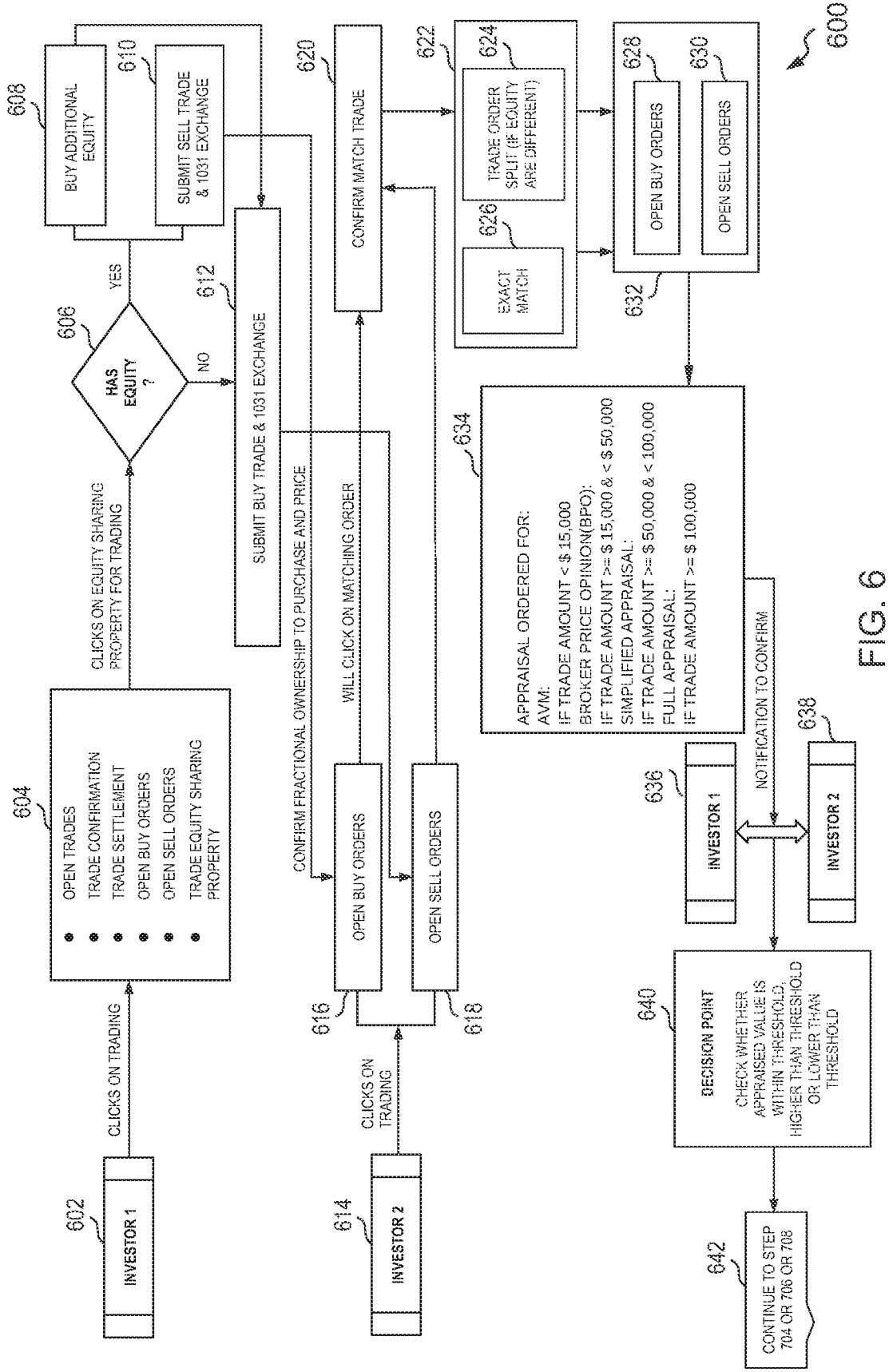
Figure 7:
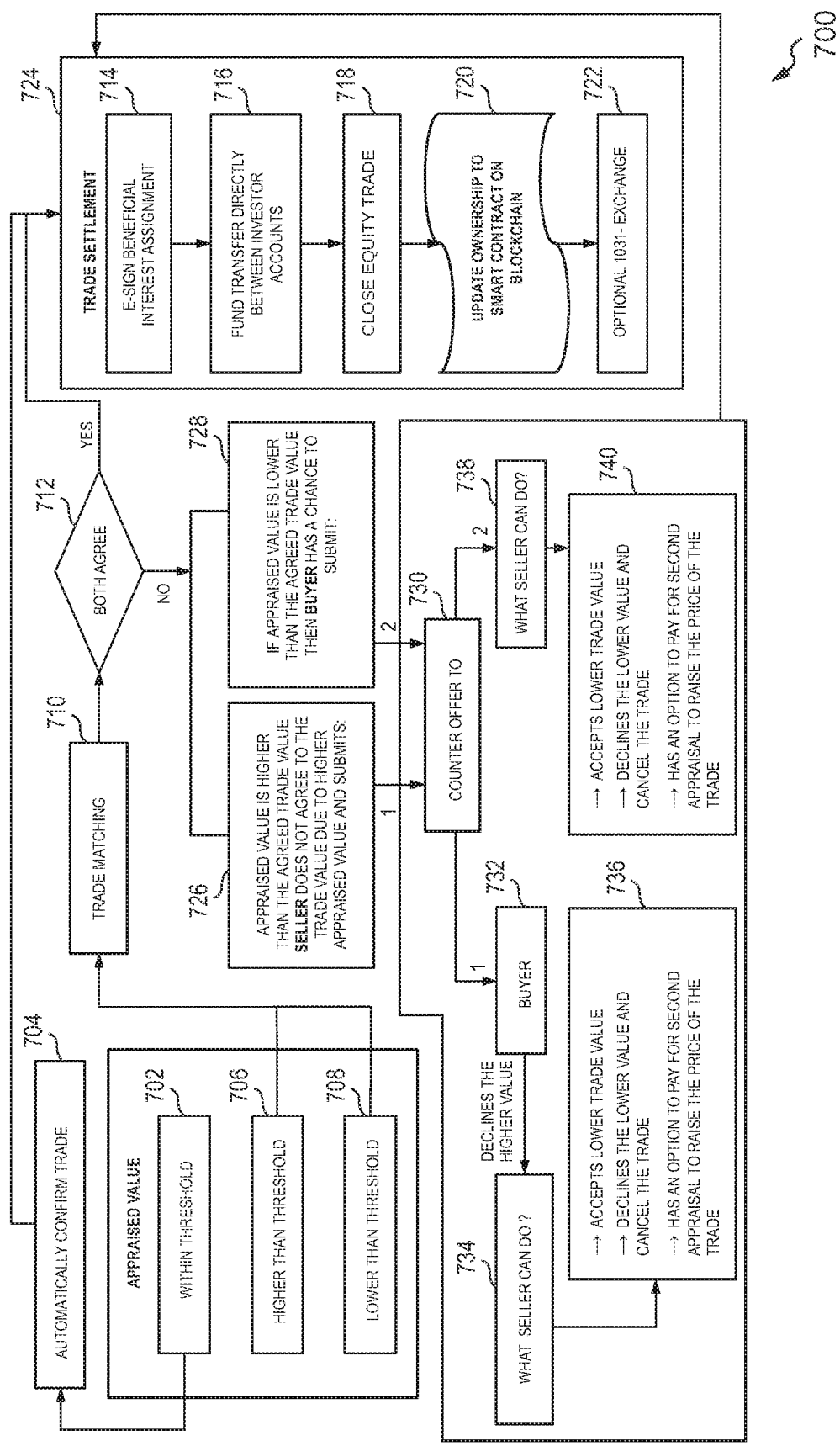
Figure 8:
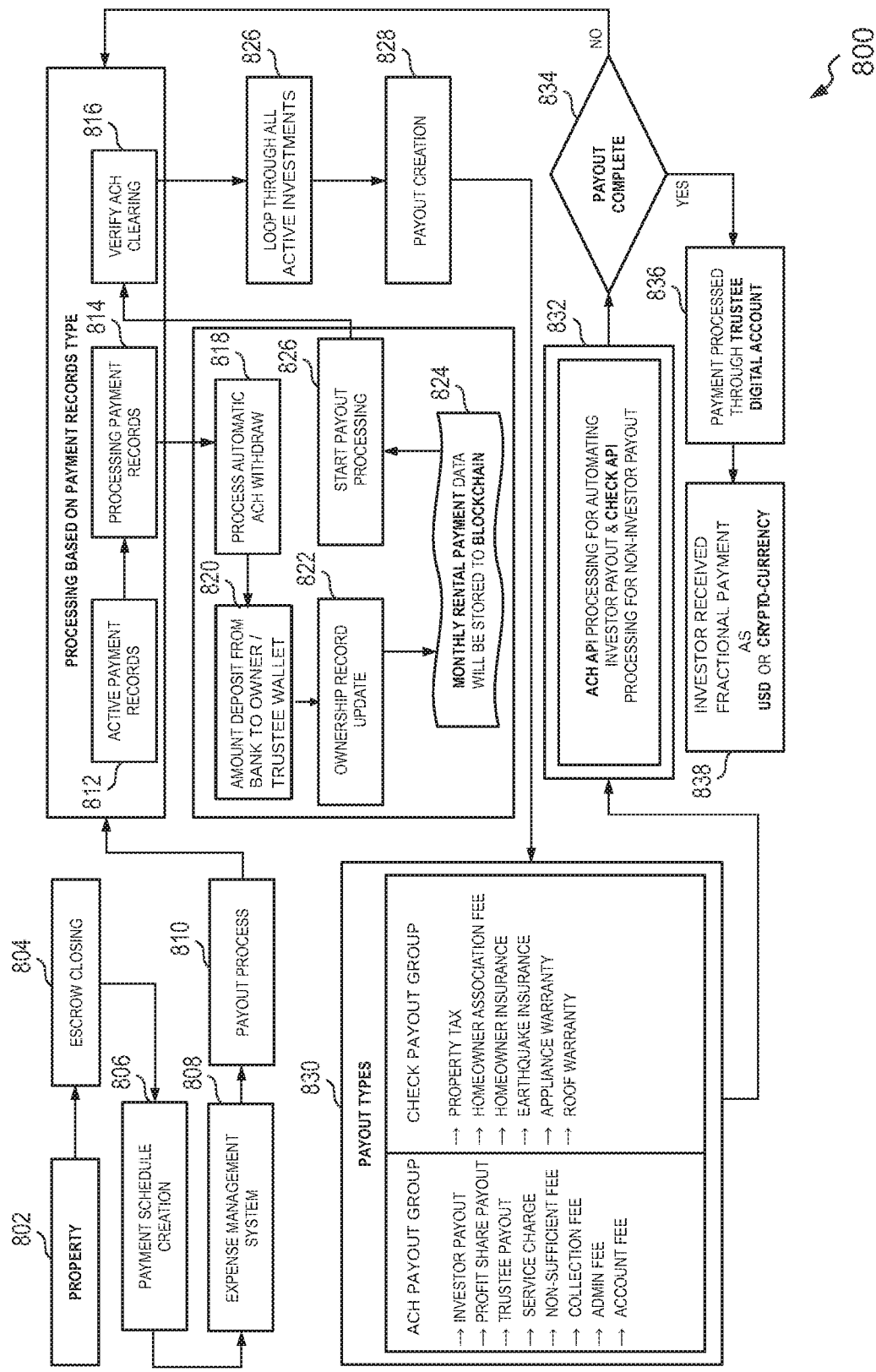
Figure 9:
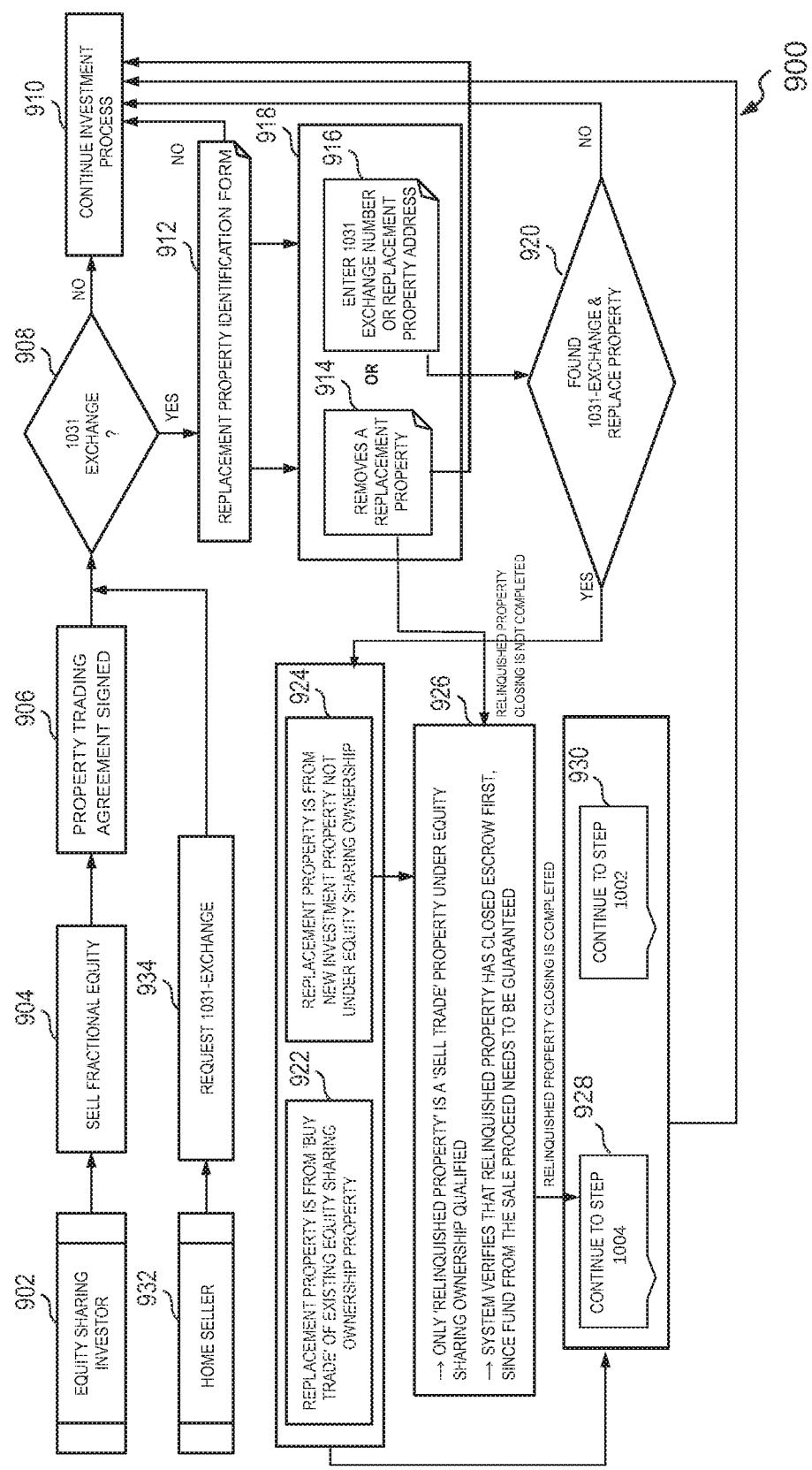
Figure 10:
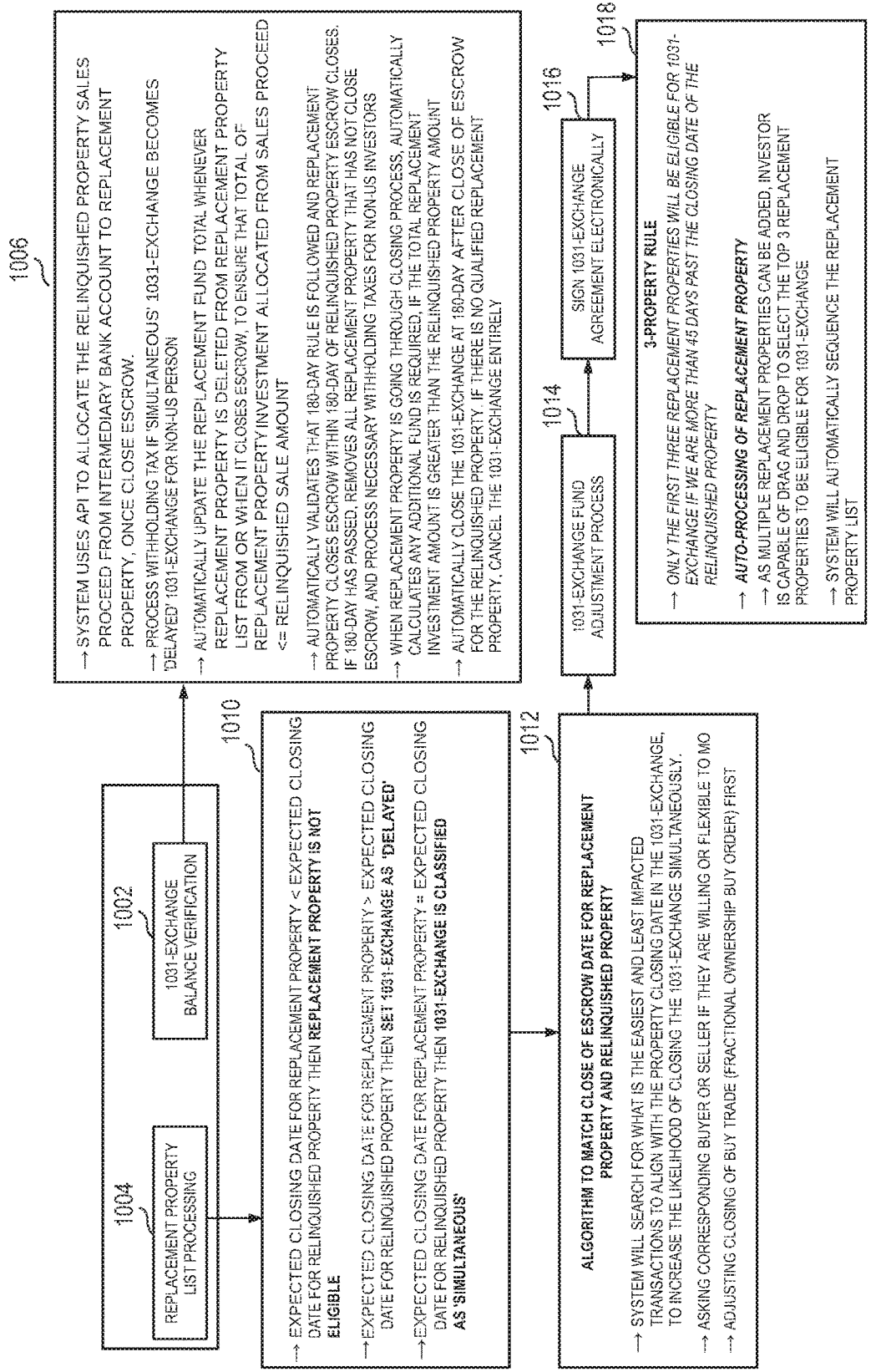
Figure 11:
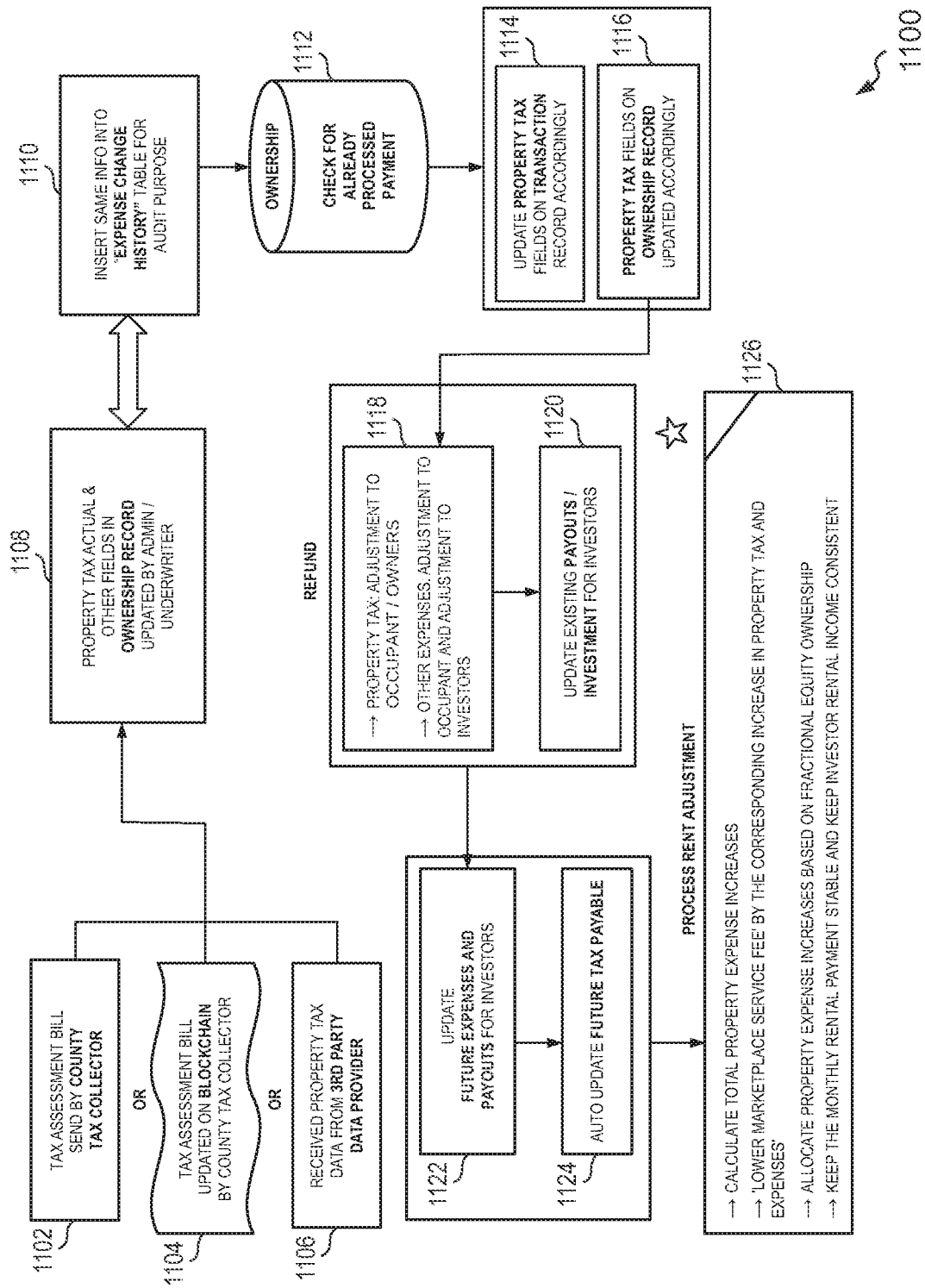
Figure 12:
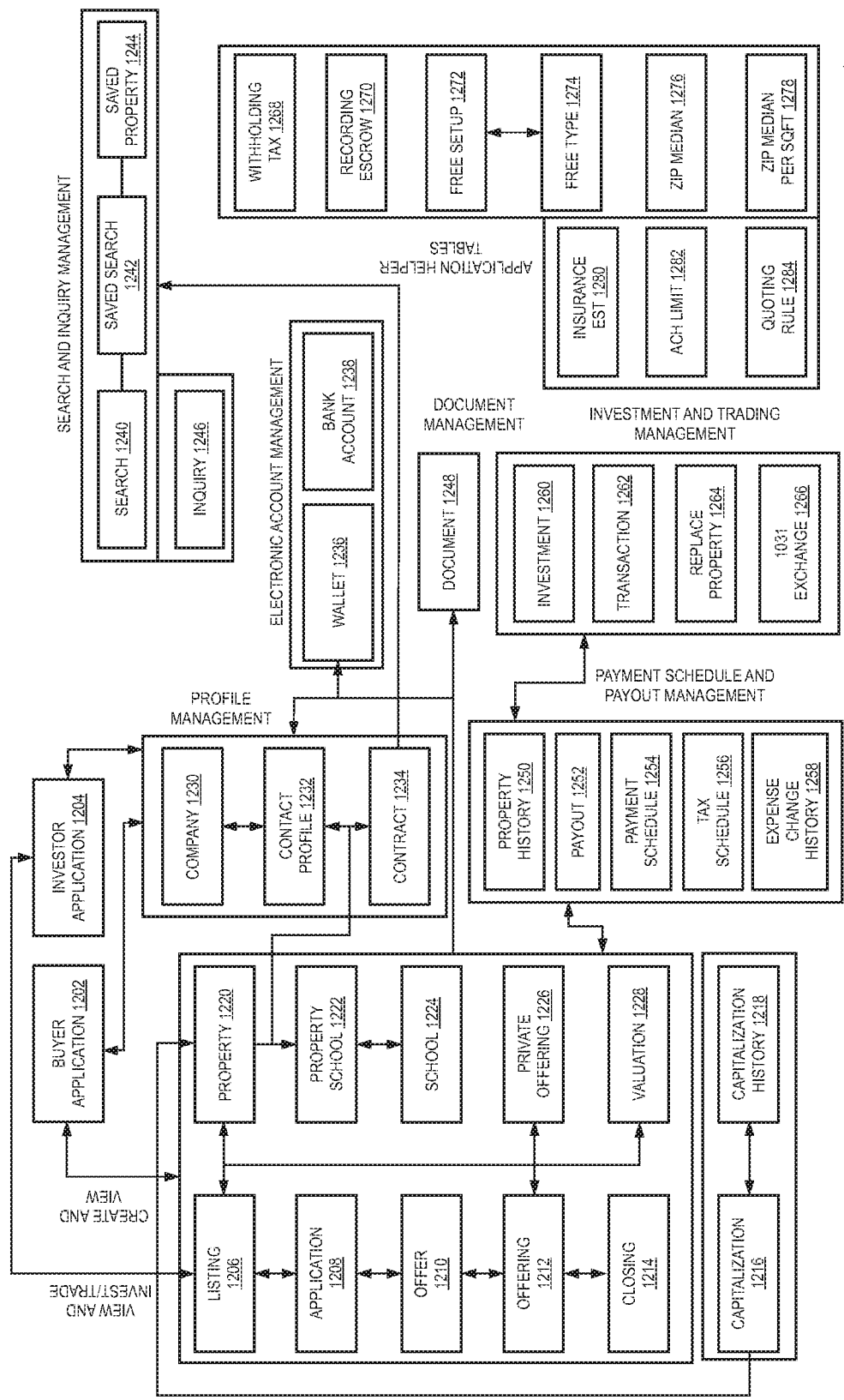
Figure 13:
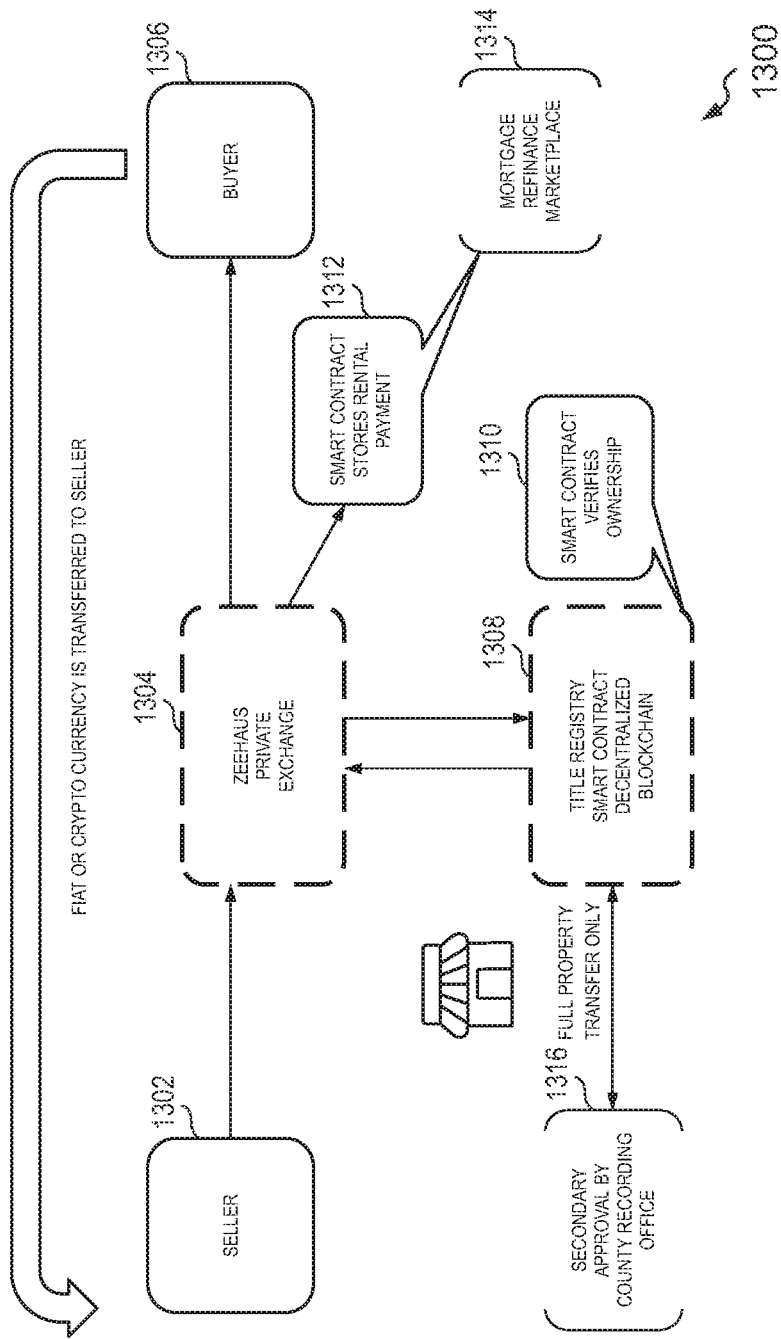
Figure 27:
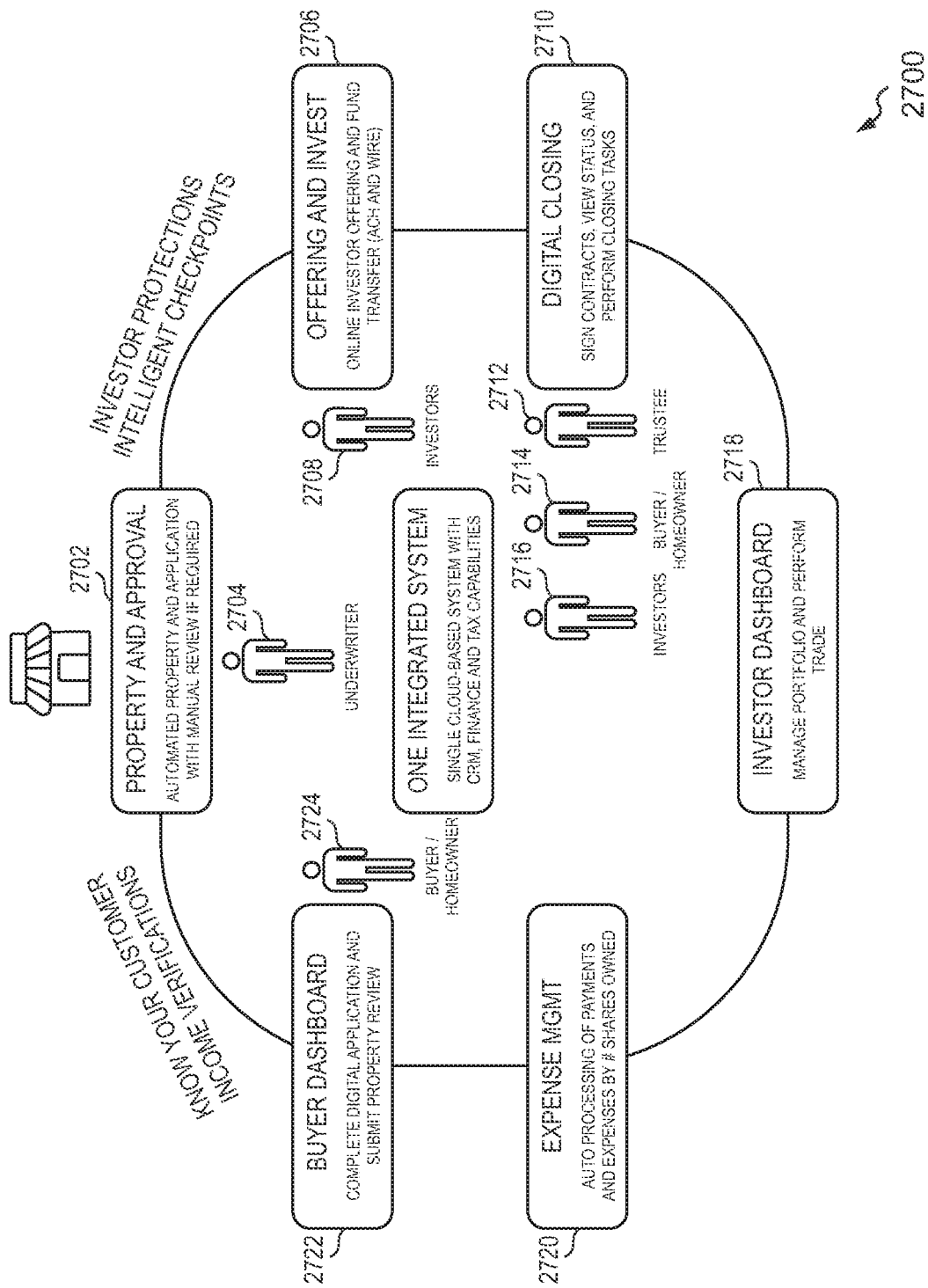
Figure 28:
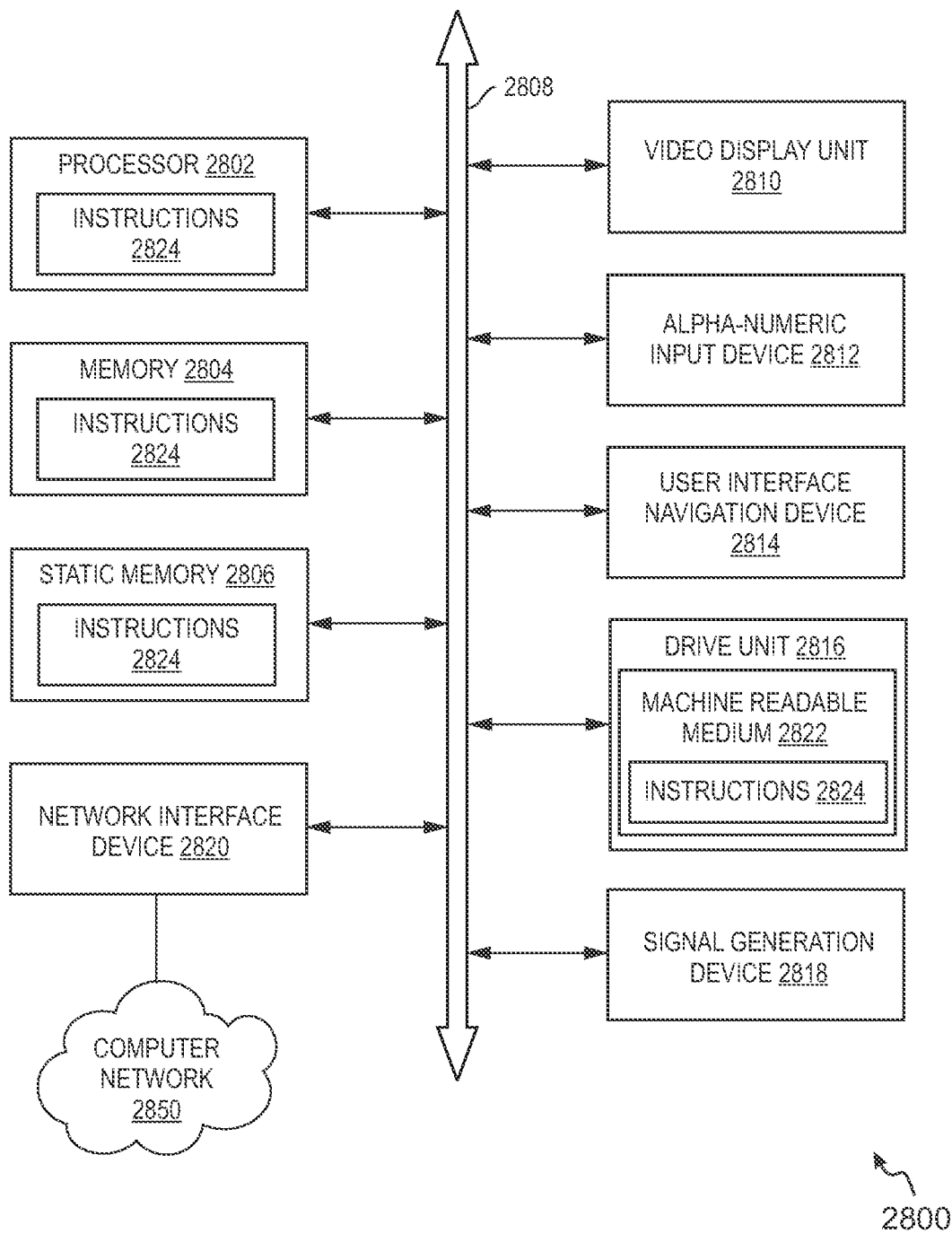
Figure 29:
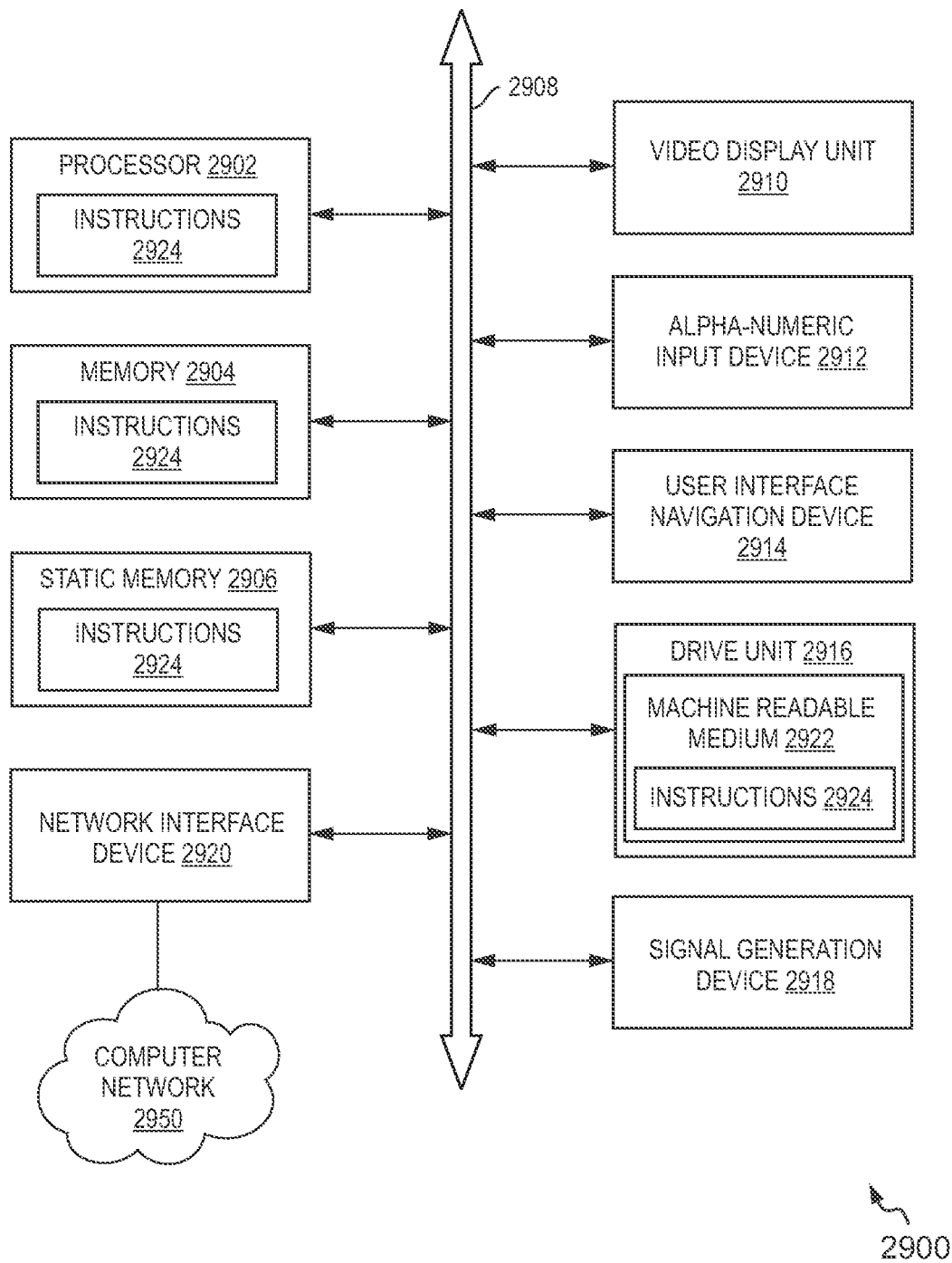
Figure 30:
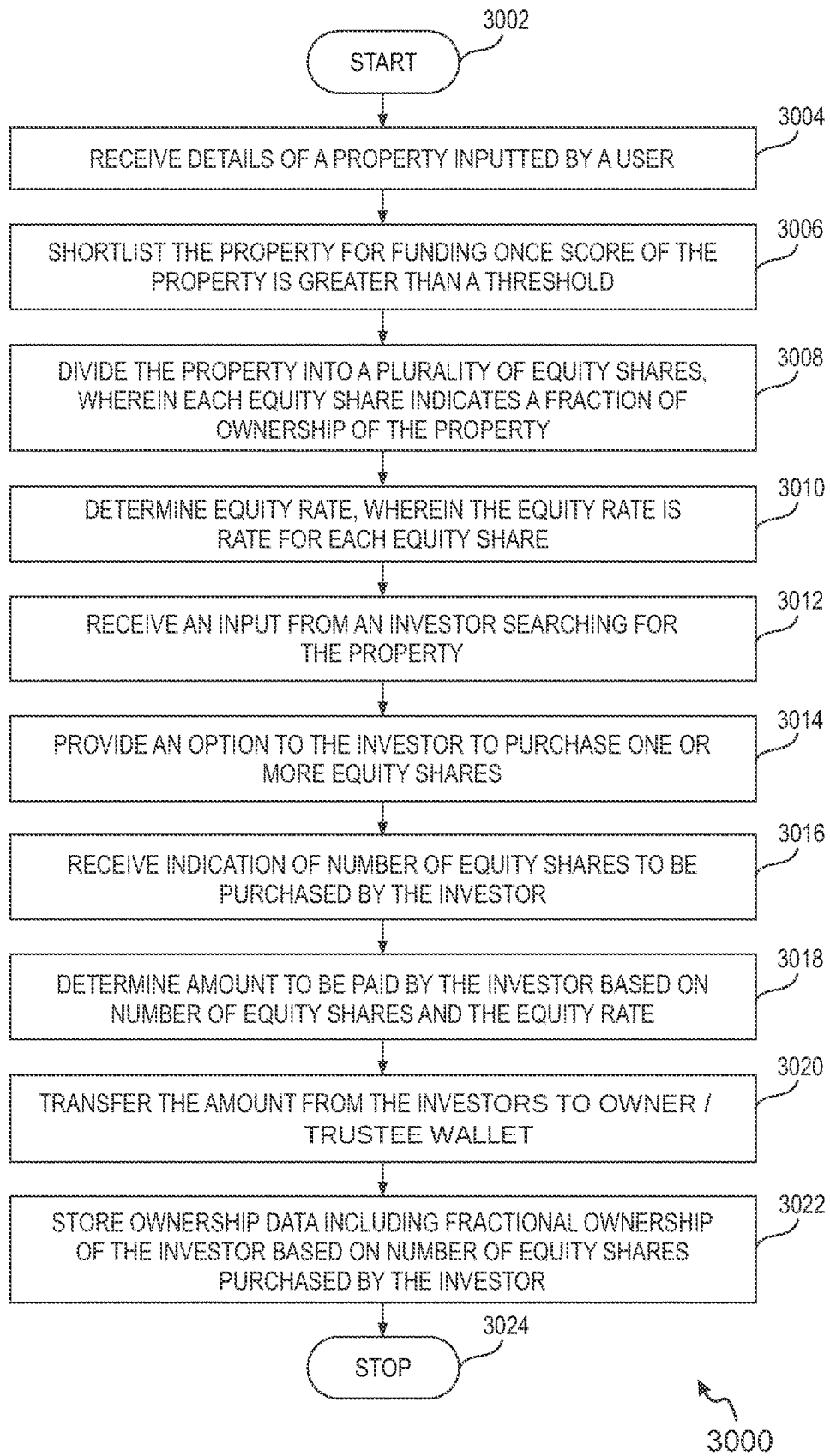
Figure 31:
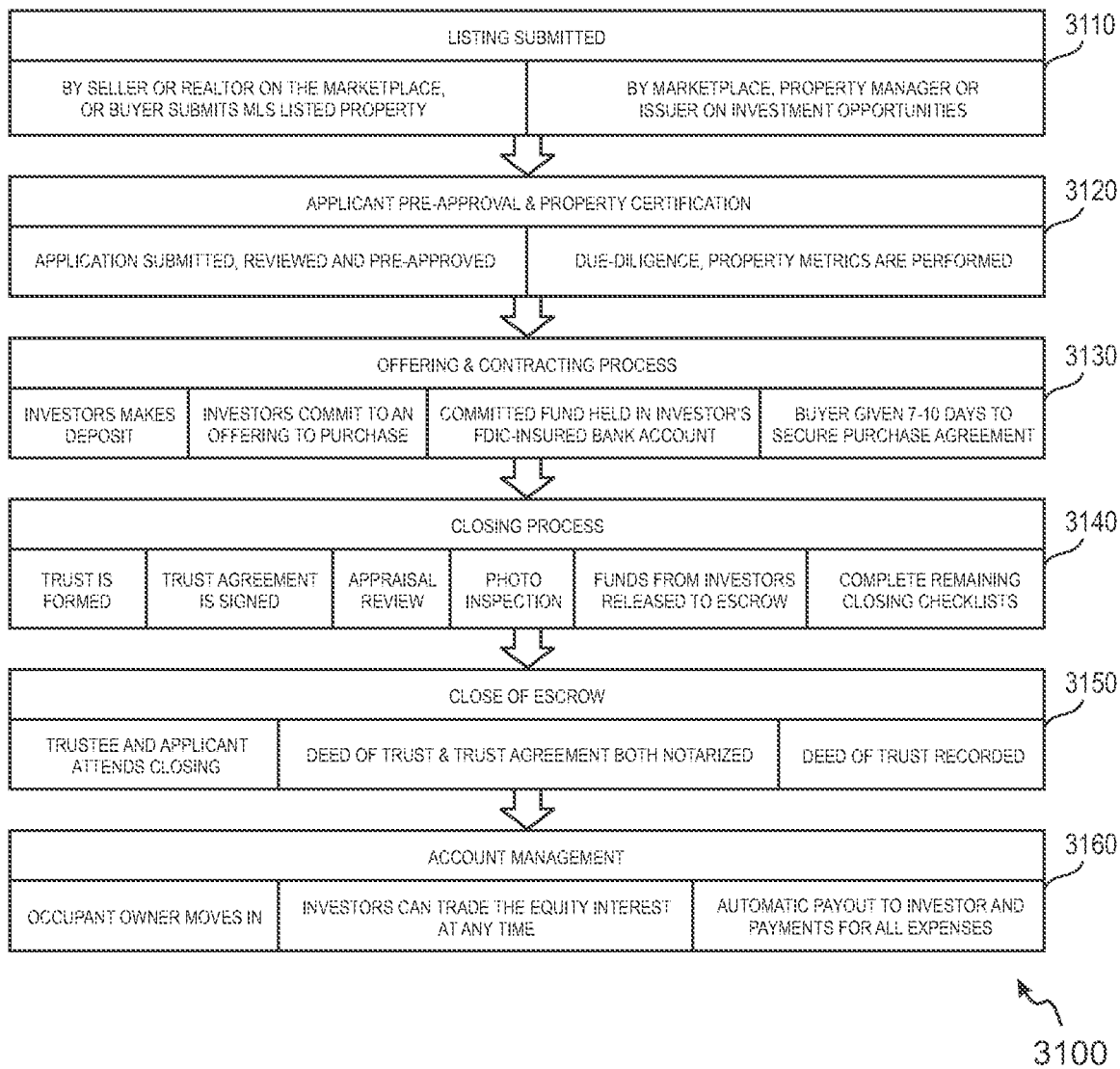

FIG. 6 and FIG. 7 include a flowchart of a method for performing trading of equity of real estate property, according to the embodiments as disclosed herein;

FIG. 8 is a flowchart of a method for paying out rental or money, according to the embodiments as disclosed herein;

FIG. 9 is a flowchart of a method for 1031-exchange for fractional property equity, according to the embodiments as disclosed herein;

FIG. 10 is a flowchart of a method for detailed replacement list processing and 1031-exchange balance verification, according to the embodiments as disclosed herein;

FIG. 11 is a flowchart of a method for property expenses adjustment and rent stabilization, according to the embodiments as disclosed herein;

FIG. 12 is a detailed view of a database stored in a storage device, according to the embodiments as disclosed herein;

FIG. 13 is a flow diagram illustrating property title and payment update using smart contract and block chain, according to the embodiments as disclosed herein;

Figure 16:
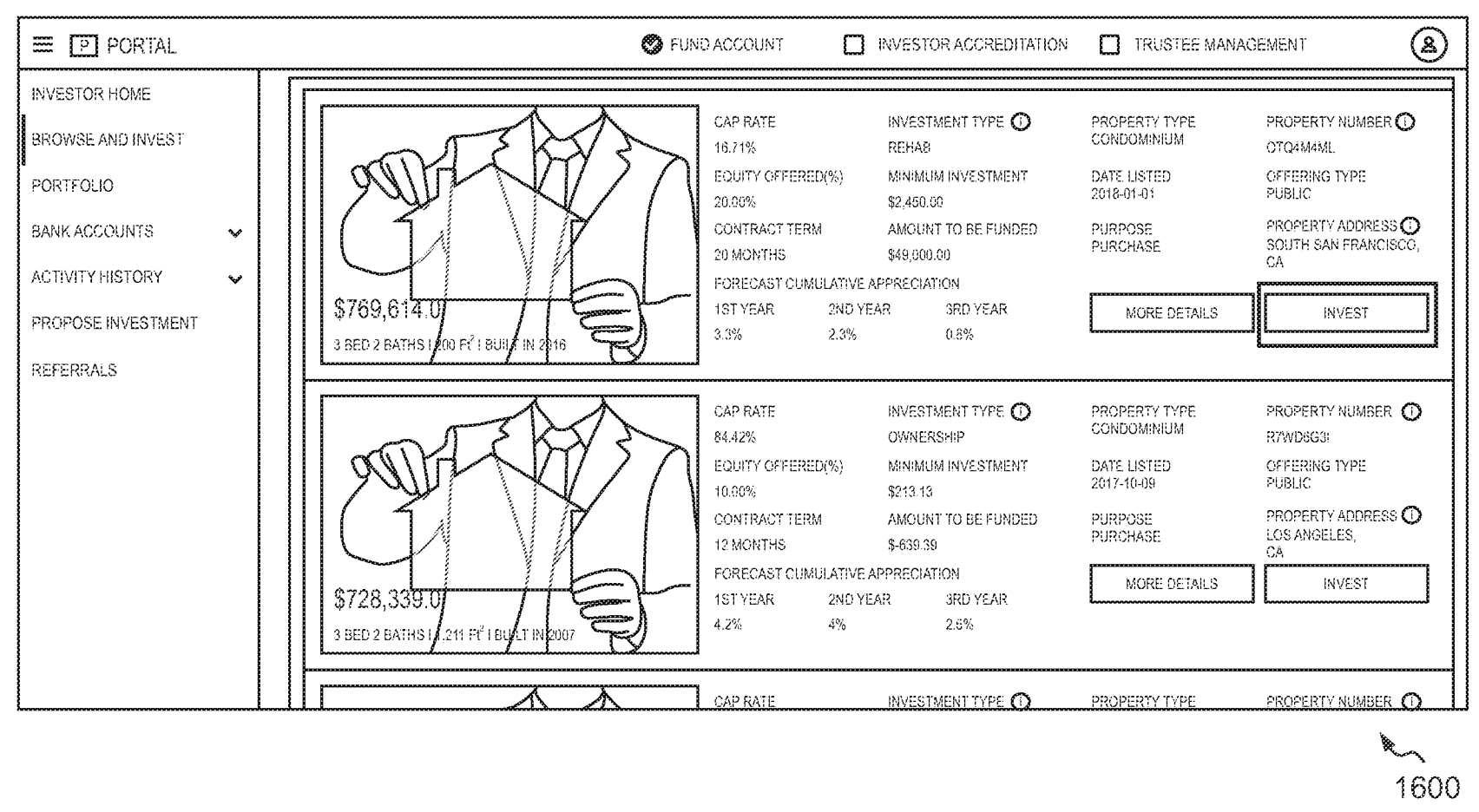
Figure 17:
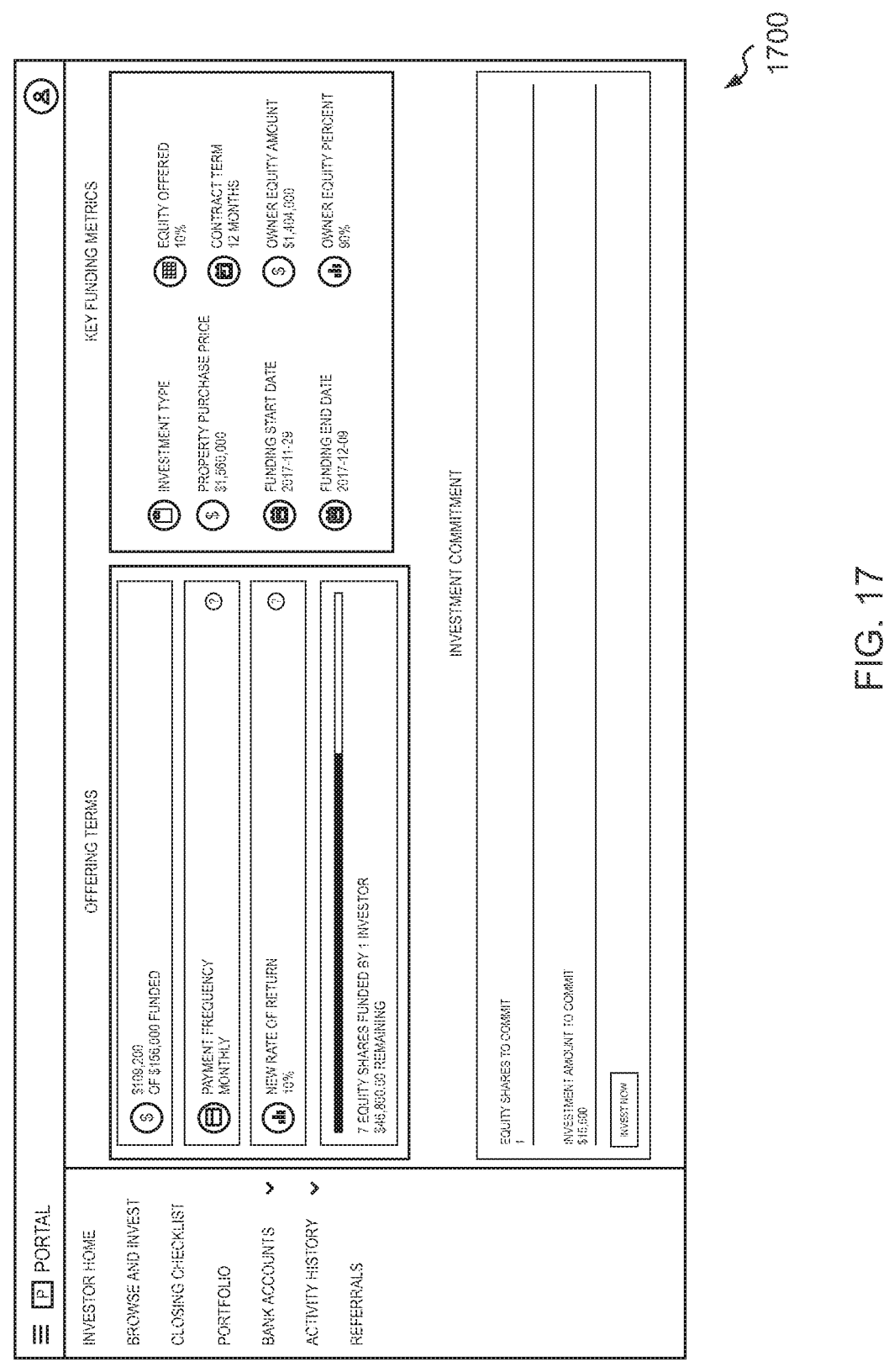
Figure 20:
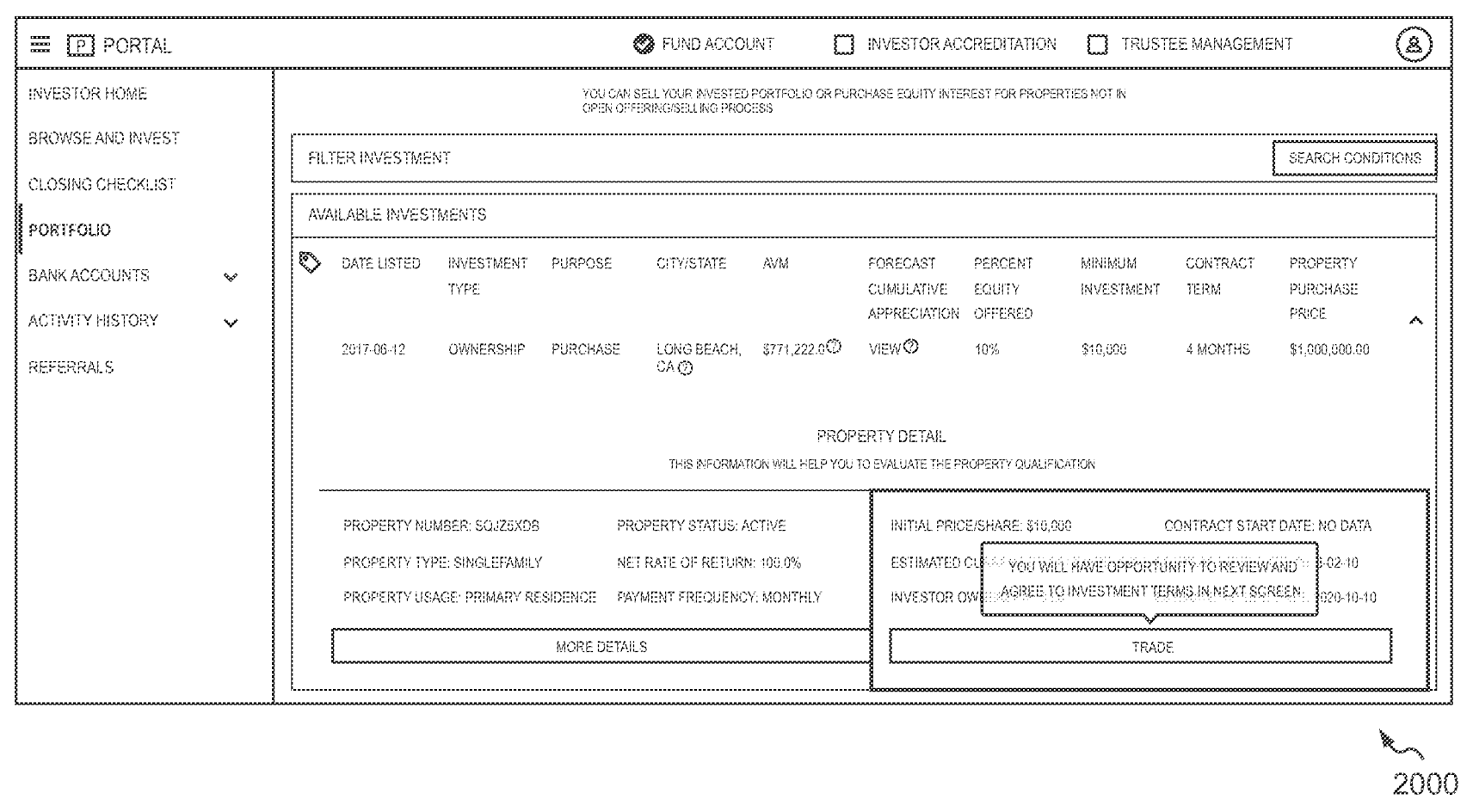
Figure 21:
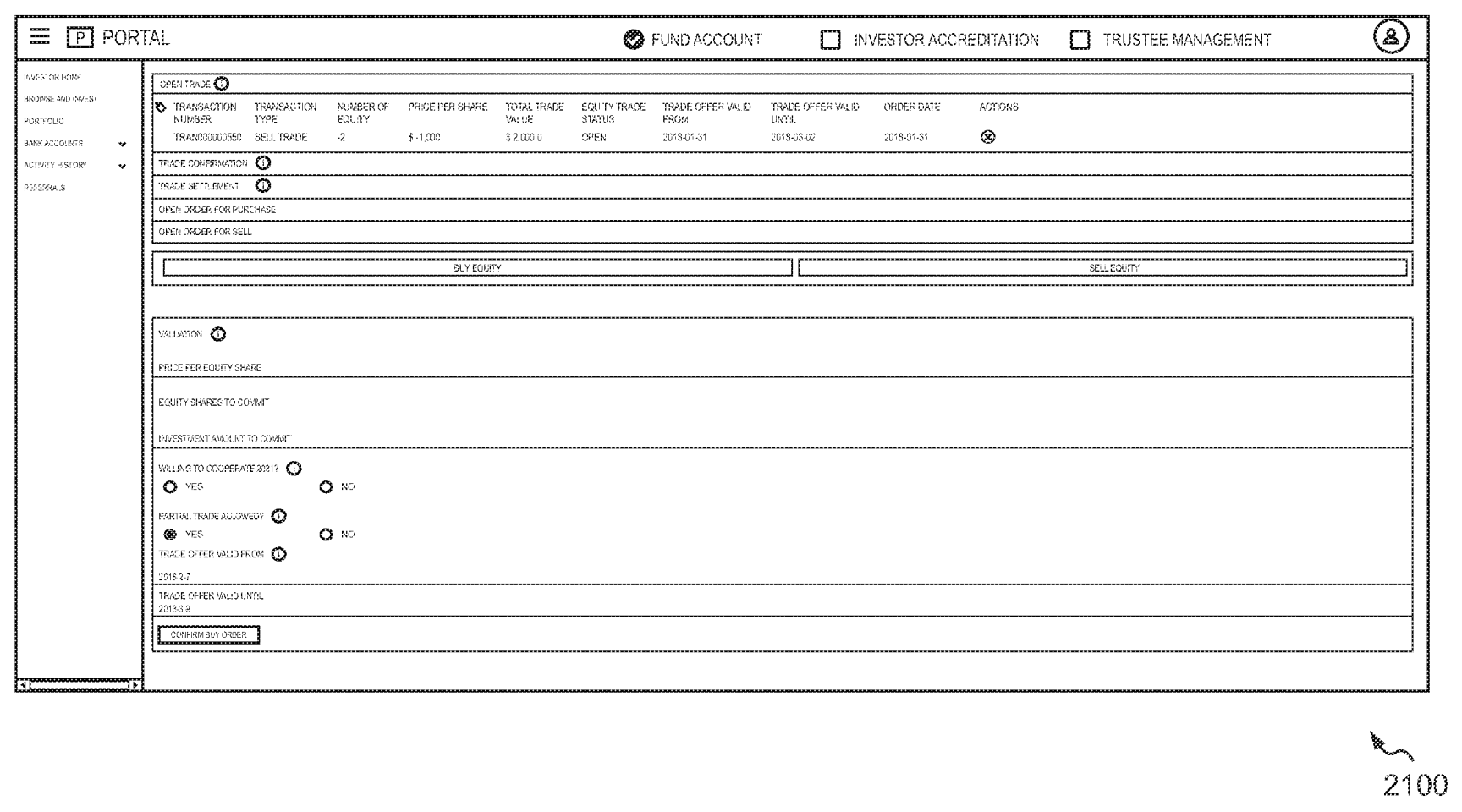

FIGS. 14-21 are snapshots of user interface provided by a portal, according to the embodiments as disclosed herein;

Figure 22:
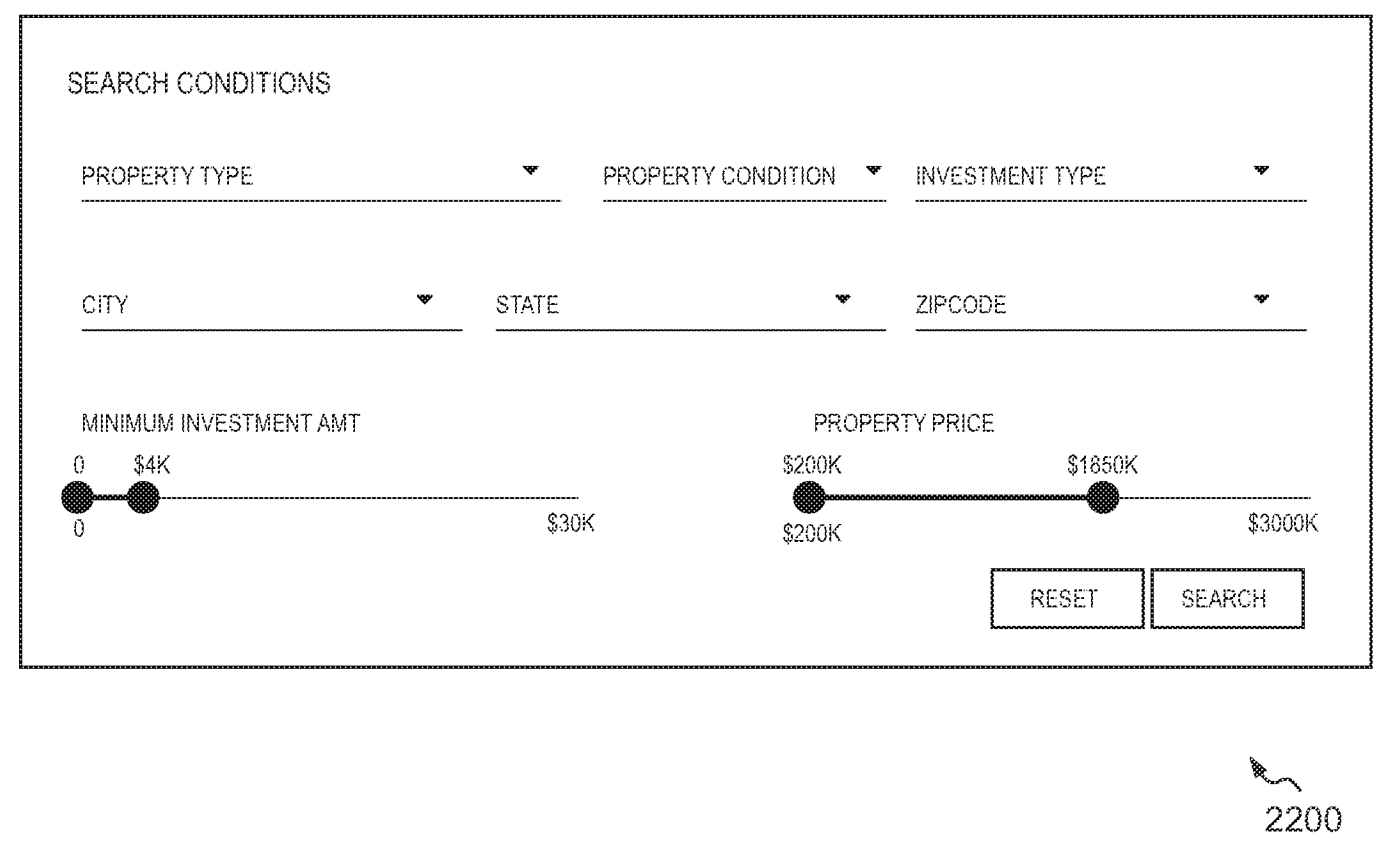

FIGS. 22-26 are snapshots of investment commitment process details provided by the portal, according to the embodiments as disclosed herein;

FIG. 27 is a flow diagram illustrating overall working of the environment, according to the embodiments as disclosed herein;

FIG. 28 is a block diagram illustrating a device such as buyer device or investor device, according to the embodiments as disclosed herein;

FIG. 29 is a block diagram illustrating a server, according to the embodiments as disclosed herein;

FIG. 30 is a flowchart of a method for equity sharing of a property, according to the embodiments as disclosed herein;

FIG. 31 is a flowchart of another method for equity sharing of the property, according to the embodiments as disclosed herein; and FIGS. 32A and 32B are snapshots of replacement property process details provided by the portal, according to the embodiments as disclosed herein.

DETAILED DESCRIPTION OF THE EMBODIMENTS

The above-mentioned needs are met by a method and a system that allow an individual to purchase real estate property using equity sharing.

The method allows individual prospective home buyer (also referred to as the buyer) to purchase real estate property (also referred to as the property) using equity sharing by putting the real estate property into a title-holding trust (also referred to as the trust) and dividing the property into 100 (or any fractional number of) equal and undivided fractional interest which completely replaces the need for traditional debt/mortgage financing by enabling investors/buyers to purchase the property together. The method enables the home buyer to purchase real estate property by agreeing to share equity appreciation with investors and, in return, the home buyer receives funding required, while investors receive actual equity of the property. The method allows investors/buyers to purchase the real estate property together and gives investors an opportunity to commit fund from 1% (or any fractional percentage) of the property value. The method creates new investment and home buying to bring new sharing economy to real estate equity investment, and promote homeownership with a 100% automated and digital investment method.

A method for equity sharing of a property is provided, where the method includes: receiving details of a property inputted by a user and by retrieving property data publicly available; short listing the property for funding once score of the property is greater than a threshold; dividing the property into a plurality of equity shares, wherein each equity share indicates a fraction of ownership of the property; determining equity rate, wherein the equity rate is rate for each equity share that buyer is paying investor for the right of solely occupying property; receiving an input from an investor searching for the property; providing option to the investor to purchase one or more equity shares; receiving indication of number of equity shares to be purchased by the investor; determining amount to be paid by the investor based on number of equity shares and the equity rate; transferring the amount to a trust; storing ownership data including fractional ownership of the investor based on number of equity shares purchased by the investor; automating the contract signing and close of escrow process; and post-purchase capabilities including fractional trading, 1031-Exchange, investor payout processing etc.

There are several types of buyers that benefits from equity sharing. For example, buyers with no credit or less perfect credit but having good asset and income. Millennial buyers just out of reach to put down 20% and who are waiting on the sidelines and looking to purchase. Buyers who were denied mortgage previously. Any other buyer who wants a simplified and quick buying process, for a strong offer, and without the time for getting a mortgage with a bank/lender. There is no existing system and method that enable buyers, sellers and investors to participate in an automated platform and solve the extreme complexity that is required to handle the fractional purchase, closing process, ownership management, payout distribution, tax handling, fractional selling, and equity sharing contract renewals, which is what the system and method described herein accomplish.

Buying a house becomes an enjoyable experience and getting financing becomes a simple to understand and transparent process, as long as due diligence is taken using the method and system disclosed herein. The system leverages sharing economy and crowd-investing concept to home buying for the mass market, with the homeowner giving property equity and equity appreciation to investors in exchange for the advanced investment and lower housing payment, without the complex process and additional effort of obtaining the mortgage.

The benefits of equity sharing for buyers includes stronger offer, streamlined buying/equity financing process, decreased investment fees during the terms of equity sharing agreement, typically five (5) to seven (7) years, ability to purchase additional equity yearly from investors, ability to buy with less cash and/or credit than debt financing, due-diligence property inspection, lower and stable housing payments, rights to refinance after fixed number of years, renewal of equity sharing agreement, and simplified selling process. The benefits for investors include full property appreciation with equity ownership, high-liquidity investment in real property, low cost of entry, tradable fractional ownership, simple investing platform and everything electronic and online, and investment protection. The system implemented by marketplace also offers risk-avoidance strategy, allowing both home buyer and investors to share profits while assisting the home buyer with a goal of homeownership, and thus creating a win-win situation.

The method of equity sharing differs from traditional debt/mortgage financings in many different ways: 1) there is no loan, no interest payment, no principle payment or reduction, 2) credit is not an over riding factor in the approval decision, as the method focuses on buyer income &property asset qualifications, and it re-distributes the risk between investors, marketplace, buyer/owner in an optimal way, 3) instead of debt, buyer gets equity investment and then grants investors equity interests. If property depreciates in value, then investors and buyers share the downside risks. When owner defaults, investors will be repaid from owner's equity ownership when property is sold at current appraised value and take possession, 4) the marketplace automates and streamlines approval process, and shortens the normal 30-45 days needed from traditional debt lending process to approximately 10 business days to buy and close escrow on the property, and 5) the method also offers investors significant upside with property ownership appreciation, in exchange for generally less cash flow return than other investment opportunities, such as REIT, private equity fund, or mortgage-backed products.

Figure 1:
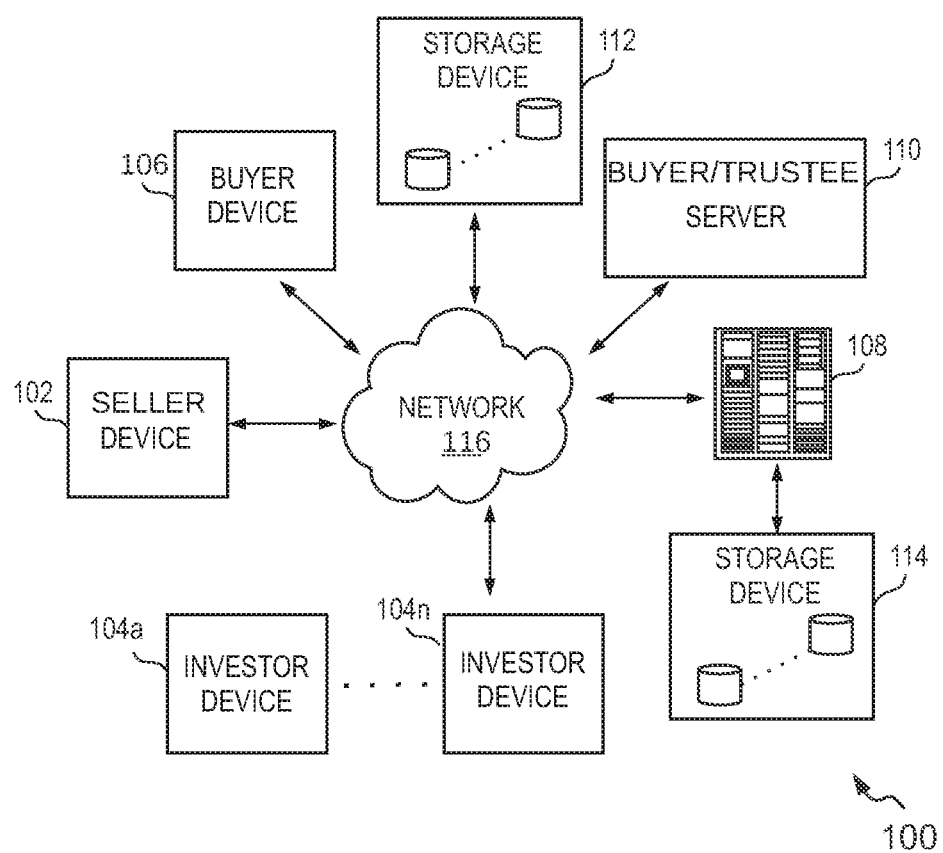
FIG. 1 is a block diagram of an environment related to at least some embodiments as disclosed herein.

FIG. 1 is a block diagram of an environment 100 related to at least some embodiments as disclosed herein. The environment 100 includes at least one buyer device, for example a buyer device 102. The buyer device 102 belongs to a buyer. The buyer, including renter, includes a person or an entity interested in a real estate property, for example residential real estate property and commercial real estate property. The buyer device 102 is connected to a network 106 via which the buyer accesses a real estate portal (not shown in FIG. 1) that supports equity sharing. The real estate portal can be a web portal, a mobile or web application, a website, or any other application that provides access to the real estate portal. Examples of the buyer device 102 include, but are not limited to, a personal computer (PC), a mobile phone, a tablet device, a personal digital assistant (PDA), a smart phone, a laptop, or any other computing device.

The real estate portal is managed by a server 108. The server 108 includes various elements to manage workflows offered by the real estate portal. The server 108 is connected to a storage device 114 that hosts various databases pertaining to real estate properties, and other data needed for the real estate portal to support various workflows. Examples of the server 108 include, but are not limited to, computer, processor, or any other computing device.

The environment 100 also includes one or more investor devices, for example an investor device 104a to an investor device 104n. Each investor device corresponds to an investor. The investor is a person or an entity interested in investing in the real estate property. The investor obtains equity in the real estate property in return of the investment. The investor devices are connected to the network 106 via which the investors access the real estate portal that supports equity sharing. Examples of the investor devices include, but are not limited to, personal computers (PC), mobile phones, tablet devices, personal digital assistants (PDA), smart phones, laptops, or any other computing devices.

The buyer, the investor, or a seller can individually or collectively be referred to as a user.

In some embodiments, the environment 100 also includes a trust server (Buyer/Trustee server) 110 that acts as trust. The trust server 110 is connected to a storage device 112. The storage device 112 stores the documents or data as needed by the trust server 110. In some other embodiments, the trust server 110 can be a part of the server 108.

Each device, such as the buyer device 102, the investor devices 104a to 104n, the server 108 or the trust server 110 shown in the environment 100, is configured with a non-transitory computer-readable medium, the contents of which causes to perform one or more steps of the method disclosed herein.

The network 106 may include any suitable number or arrangement of interconnected networks including both wired and wireless networks. Examples of the network 106 include, but are not limited to, Local Area Network (LAN), wired network, wireless network, WLAN/Wi-Fi, WiMAX, Wide Area Networks (WANs) etc.

It should be appreciated by those of ordinary skill in the art that FIG. 1 depicts the environment 100 in an oversimplified manner and a practical embodiment may include additional components and suitably configured processing logic to support known or conventional operating features that are not described in detail herein.

Figure 2:
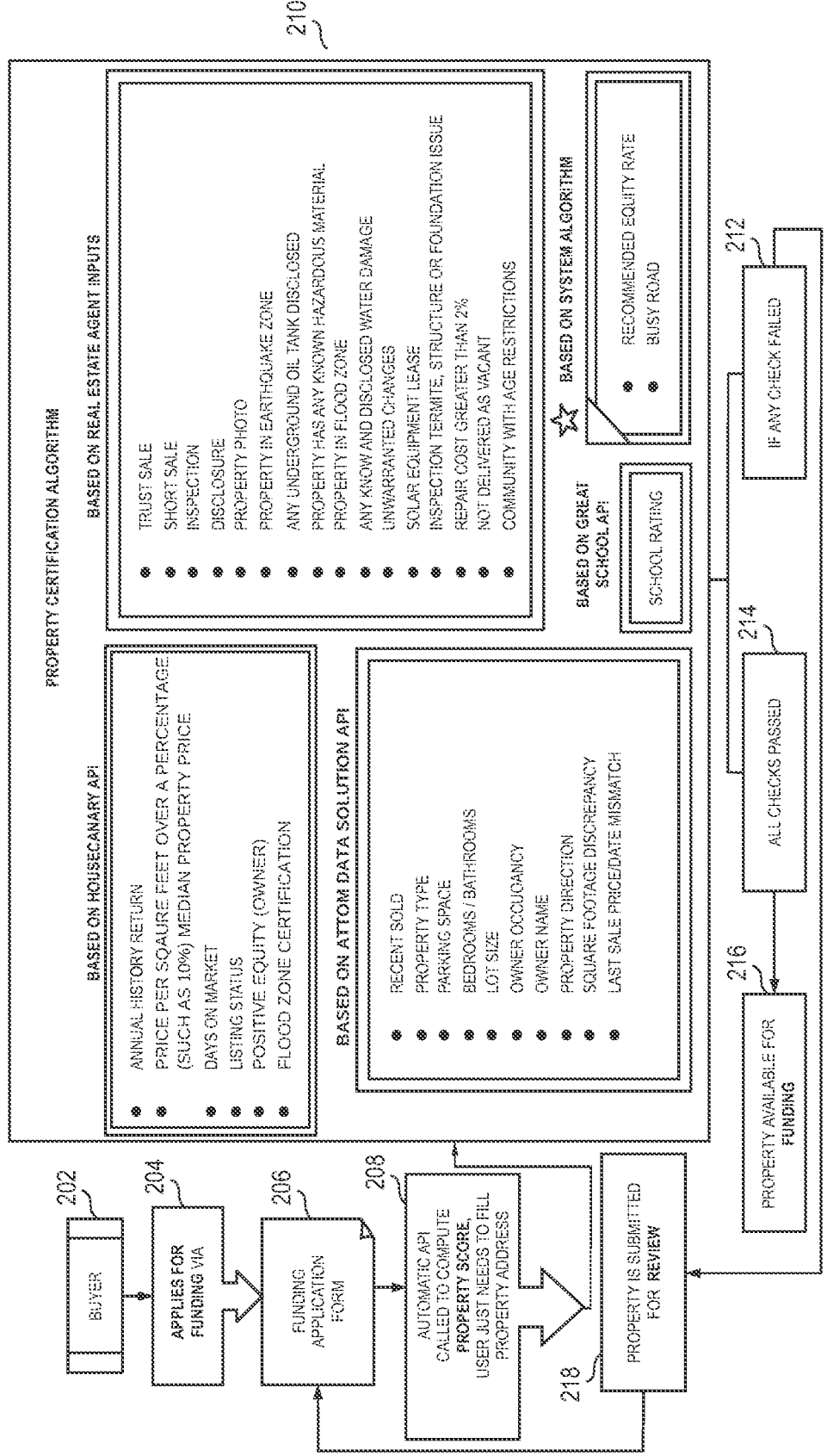
FIG. 2 is a flowchart of a method for short listing a property for funding, according to the embodiments as disclosed herein.

FIG. 2 is a flowchart of a method 200 for short listing a property for funding, according to the embodiments as disclosed herein.

The short listing is performed using property certification algorithm. The algorithm includes various parameters including latitude/longitude to find closest road with related speed limit, distance to retail store, direction the property faces, etc. in order to calculate the property noise factor. The roads in the close vicinity of the property, which in one embodiment, is set to be 110 meters from all four directions of the property, are analyzed to determine if the speed limit exceeds a certain threshold, based on towns. Also, all 'places' in the close vicinity of the property are analyzed, to check if there is any stores or business categories that might impact the value of the property. In addition, various checkpoints, including short sale, school rating too low, property sold too recently, property priced higher than medium price per square foot, owner name mismatch, etc. are automatically sourced from various data providers and analyzed by the algorithm to ensure that the property is functional and its physical characteristics meet the minimum standard for investment worthiness and decreases the chances of buying low-performing properties virtually. A final score (property score) is automatically calculated and decision whether the property passes due-diligence is made. The algorithm is now explained using following steps.

The method 200 starts at step 202 in which a buyer accesses a real estate portal. At step 204, the buyer applies for a request for funding of a real estate property (also referred to as the property) via various options. For example, at step 206 the buyer applies for the request for funding via a funding application form. The request is received by the server 108 via the buyer device 102.

At step 208, application programming interfaces (APIs) supported by the server 108 are called. The APIs are called to compute property score. The buyer also fills the property address. At step 210, the server 108 processes the API calls. Step 210 includes several sub-steps performed by the different APIs. For example, at step 210, the property is processed based on third-party data provider, House Canary API. This includes processing the property based on annual history return, price per square feet over a percentage (such as 10%) median property price, days on market, listing status, positive equity (owner), and flood zone certification. The outcome is the property score which is checked against a threshold to determine if the property passes all checks at step 214. The threshold can be predefined, static or dynamic based on desired measures. If yes, then the property is made available for funding at step 216. Else, if any check fails at step 212 then the property is submitted for review (in one embodiment manual review) at step 218 and the method moves to the step 206.

At step 210, the property is also processed based on following APIs.

Based on ATTOM Data Solution API—this includes processing based on recently sold, property type, parking space, bedrooms/bathrooms, lot size, owner occupancy, owner name, property direction, square footage discrepancy, and last sale price/date mismatch.

Based on Great School API—this includes processing based on school rating.

Figure 3:
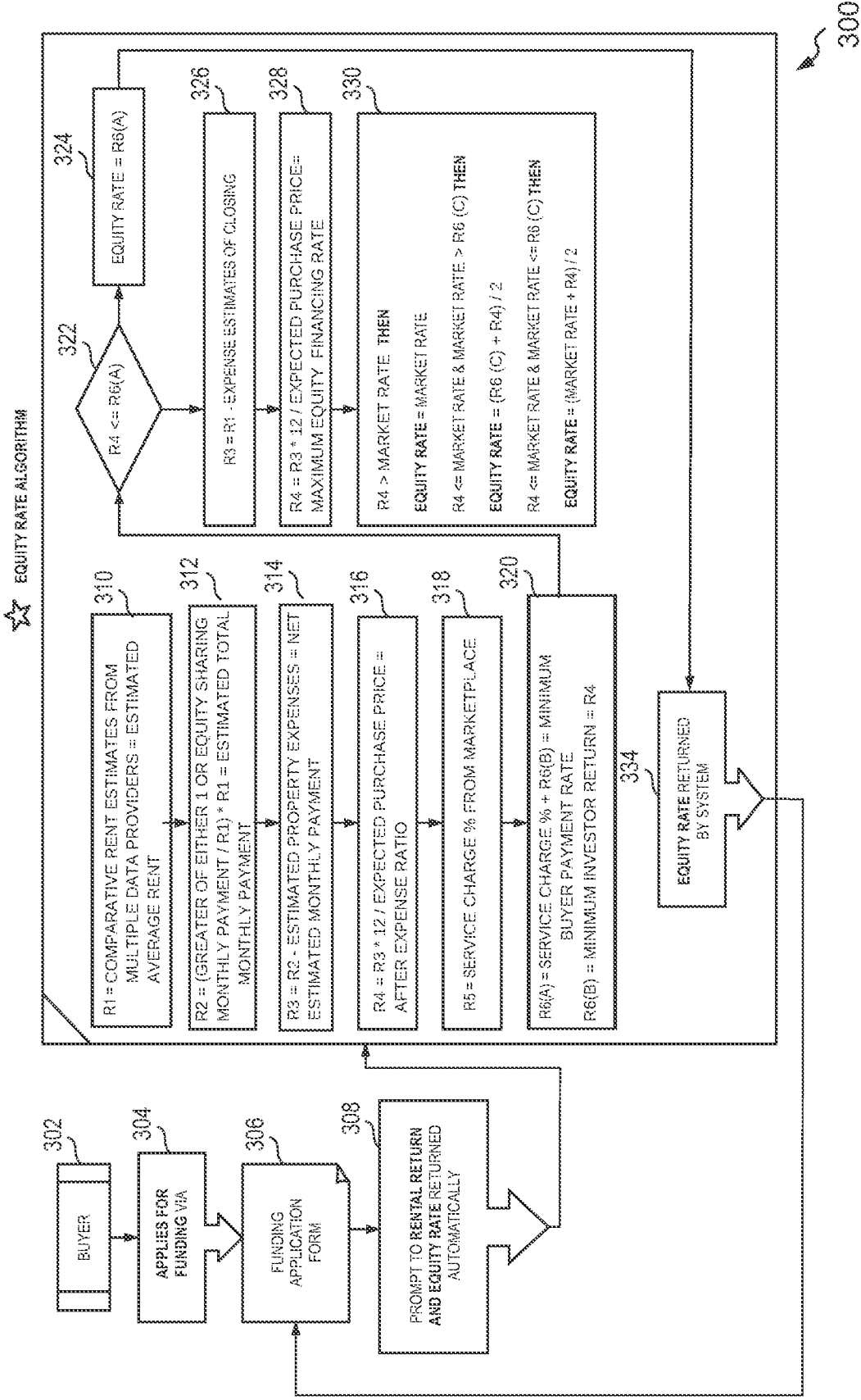
FIG. 3 is a flowchart of a method for determining equity sharing rate, according to the embodiments as disclosed herein.

Based on system (server 108) algorithm as described in detail in FIG. 3—this includes processing based on recommended equity rate, and busy road.

Based on real estate agent inputs—this includes processing based on trust sale, short sale, inspection, disclosure, property photo, property in earthquake zone, underground oil tank disclosed, any known hazardous material on property, flood zone, any known and disclosed water damage, unwarranted changes, solar equipment lease, inspection termite, structure or foundation issue, repair cost greater than 2%, vacant, and community with age restrictions.

The outcome can be determined based on each API individually or collectively, i.e. individually checking against individual thresholds or combined checking against combined threshold.

FIG. 3 is a flowchart of a method 300 for determining equity sharing rate or equity rate, according to the embodiments as disclosed herein. The equity rate indicates cost per equity that buyer is paying investor for the right of solely occupying property.

The determining step is performed using equity sharing rate algorithm. The algorithm calculates equity rate and ensure that it is always lower than the rental value of a comparable property in same neighborhood or zip code. The method 300 is able to offer renter or buyer a more affordable housing solution, by removing mortgage, removing middleman, decreasing closing cost, automating entire investment process to increase rental efficiency for investors to lower cost, and combining with algorithm to select the properties that yield monthly rent that is lower than average rent for the same zip code or neighborhood where the property is located. The algorithm is explained in detail using the method 300.

The method 300 starts at step 302 in which the buyer accesses the real estate portal. At step 304, the buyer applies for the request for funding of the real estate property (also referred to as the property) via various options. For example, at step 306 the buyer applies for the request for funding via the funding application form. The request is received by the server 108 via the buyer device 102.

At step 308, the server processes the request using the equity rate algorithm.

At step 310, R1 (Estimated Average Rent) is calculated as comparative rent estimates from at two or more independent real estate data providers. At step 312, R2 (Estimated Total Monthly Payment) is an estimate of the equity sharing monthly payment, as calculated by multiplying R1 by "equity share over rent ratio". Equity share over rent ratio is the "Monthly Payment Saving Ratio" and it indicates how much savings that buyer could save when funding through equity sharing program and it is calculated as greater of either 1.00 or percentage of 'Estimated Equity Sharing Monthly Payment' over R1. This ratio needs to be less or equal to 1 in order to offer a monthly payment that is no more than the market rental amount. Therefore, if this ratio is greater than 1, then system will use 1 as the ratio and conduct additional logic. At step 314, R3 (Estimated Net Monthly Payment) is calculated as R2 minus estimated property expense. At step 316, R4 (After Expense Ratio) is the calculated annual payment rate (after property expense) buyer would pay both investors and marketplace service charge. It is calculated as the ratio of net annual rent amount over expected property purchase price and is calculated as R3 multiplied by 12 and divided by expected purchase price.

At step 318, R5 is service charge percentage marketplace is charging for this equity sharing ownership, based on various factors, such as market location, property value, and type of transaction. At step 320, R6(A) is Minimum Buyer Payment Rate, which is the rate charged by marketplace plus the minimum investor rental return, and it is calculated as service charge %+Minimum Investor Return. R6(B) is the Minimum Investor Return, which is equal to R4.

At step 322, a check is made to determine if R4 is less or equal than R6(A). If Yes, which indicates that calculated annual payment rate is not enough to cover the minimum investor return, then at step 324, the equity rate is determined as R6(A). If No at step 322, then move to step 326, at which R3 is re-calculated as R1 minus estimated property expense.

At step 328, R6(C), additional logic is performed to determine Maximum Equity Financing Rate, and is calculated as R3 multiplied by 12 and divided by the expected purchase price.

At step 330, various checks are performed to determine equity rate appropriately.

If R4 is greater than market rate than equity rate is determined as market rate.

If R4 is less than or equal to the market rate and the market rate is greater than R6(C), then equity rate is determined as sum of R6(C) and R4 divided by 2.

If R4 is less than or equal to the market rate and the market rate is less than or equal to R6(C), then equity rate is determined as sum of the market rate and R4 divided by 2.

At step 332, the equity rate is returned by the server 108.

Figure 4:
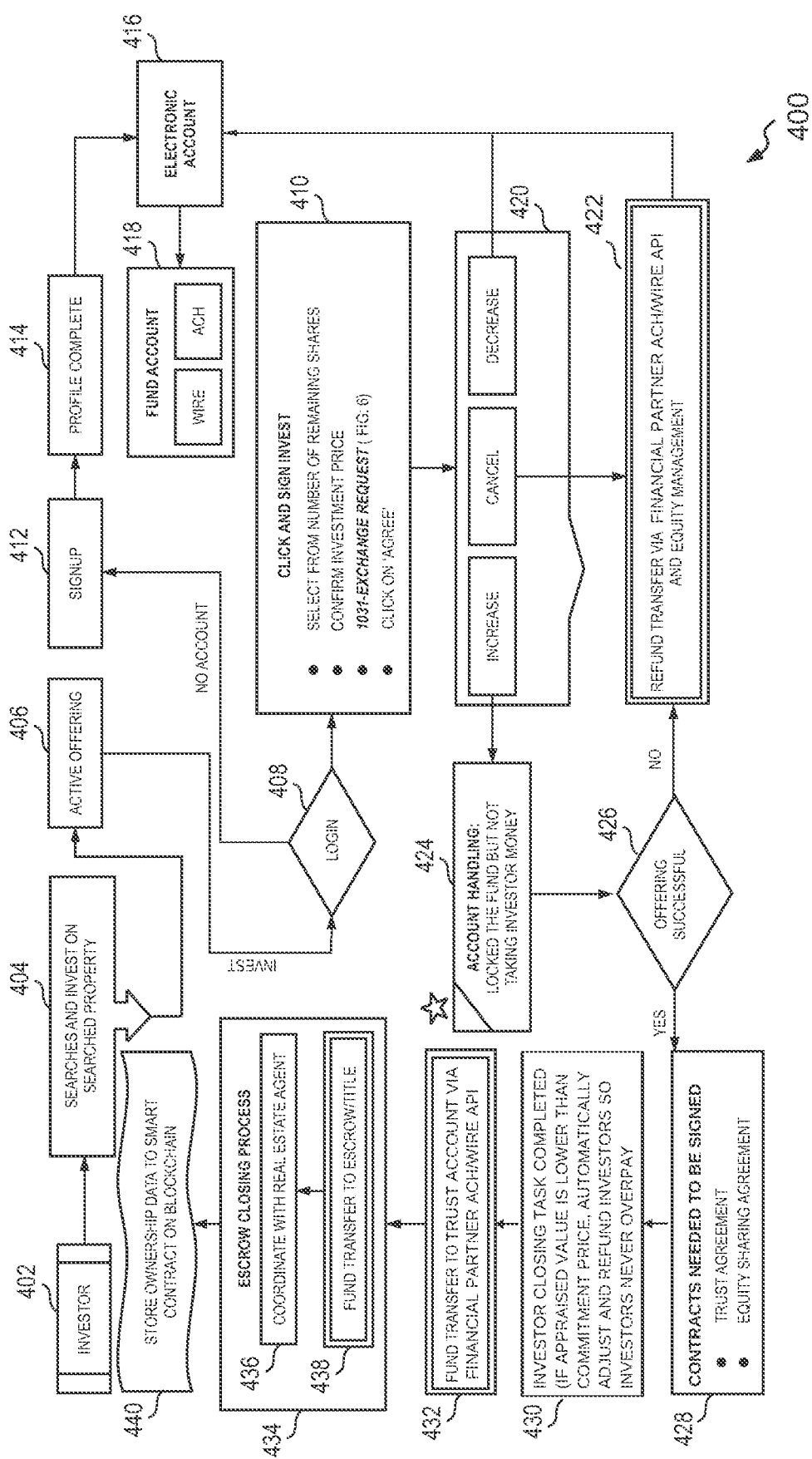
FIG. 4 is a flowchart of a method for performing real estate property purchase, according to the embodiments as disclosed herein.

FIG. 4 is a flowchart of a method 400 for performing real estate property purchase, according to the embodiments as disclosed herein.

The method 400 includes using integrated digital click and e-sign to complete the buying of actual property ownership under common-law grantor trust with ownership also stored in block chain. The method 400 enables buyers and investors to co-own the same property, and perform property search, due diligence, offering, commitment, ordering appraisal, and complete the entire escrow process. First, applicant/buyer submits a request to purchase the property and the method 200 and 300 completes the due-diligence process. Then using the method 400, the investors can search properties to invest based on location, property type, property value, etc. The investors can also review the property metrics, forecasts, key characteristics etc. Finally, the investors select the 'Number of Equity to Commit' (fractional percentage of property from 1% to 100%). The method 400 then displays corresponding investment property fractional value followed by the method 400 receiving an input of 'Invest Now' and 'Agree'. Once offering/funding is successful and property purchase agreement is secured and property is under escrow, system will notify investors and complete e-signature on two documents (Trust Agreement & Equity Sharing Agreements).

The method 400 starts at step 402 at which an investor accesses the real estate portal (also referred to as the portal) via an investor device. At step 404, the investor searches the property using various options, such as location, property type, property value etc., provided by the portal. The search input is received by the portal that enables searching in conjunction with the server 108. The search results are then provided to the investor and the investor then selects a property under active offering for investing. The search results include various data related to the property.

At step 406, an active offering or desire for an offer is received from the investor. The investor then logins at step 408. If the investor is a first-time user, then the investor signs up at step 412 and completes the profile at step 414. An electronic account is also configured for the investor at step 416.

After the investor logins, the investor can invest by choosing click and sign invest option at step 410. The investor is shown number of remaining shares of the property and the investor can select from the number of remaining shares. The investor confirms the investment price and performs other steps like 1031-exchange request (described in detail later) and clicks on agree.

At step 420, the investor can either increase the investment or decrease it or cancel it. The step 420 is called commitment adjustment step and is further described in detail in FIG. 5. If decreased, then at step 416, the electronic account of the investor is fetched and the account is funded at step 418 via WIRE transfer or ACH (Automated Clearing House).

If canceled, then at step 422, the refund is transferred via Financial Partner API and equity management.

If the investment is increased or agreed, then at step 424, the fund of the investor gets locked. In some embodiments, the money is not deducted from the investor account at this step. The method 400 pools all investors who are looking to commit to ensure that the committed fund does not exceed total requested equity offered to investors. The method 400 ensures that equity committed does not exceed total equity offered in real time, and stops whenever the total is reached. Committed fund from the investors are locked. Locking means keeping the fund in investor own bank account, but investors would not be able to use the fund during the time the property is being funded for equity sharing, but the fund is not taken or transferred to escrow or title company. The funds are not taken from investors, as equity crowd investing purchase relies on all investors who committed would be able to fund the purchase as committed/promised. However, the server 108 does not take their money due to escrow regulation and also due to issues that would arise from fund transfer without actual purchase, as property is not 100% sure to be committed, since not all purchases might already have signed purchased agreement during the funding period.

If property purchase agreement is not secured between trustee/buyer with seller, then the fund for investors are unlocked immediately for other investment opportunities.

At step 426 a check is made if offering is successful and if no, then method 400 moves to step 422. But if yes, then investors are notified via electronic communication and signs back into the portal via an investor device, then electronic contracts are displayed for signing. The contracts include trust agreement and equity sharing agreement.

At step 430, the closing task is completed digitally. If appraised value is lower than commitment price, automatically adjust and refund investors so investors never overpay.

Once the property is fully committed by the investors, at step 432, the money is transferred from each investor's accounts to owner/trustee wallet i.e. the Buyer/Trustee Server 110, via Financial Partner API (in some embodiments). At step 434, the escrow closing process is performed. At step 436, coordination with real estate agent is performed followed by the fund transfer to escrow/title via Financial Partner API at step 438.

Then the entire purchase and close escrow process is automated to complete the property purchase and entitle investors with actual ownership. Trustee represents the investors who had invested virtually and applicant/buyer is a co-buyer to work together to conduct the inspection, walkthrough, and complete inspection and appraisal process. Once completed, buyer/applicant becomes the occupant with sole occupancy rights.

At step 440, the ownership data is stored along with the contracts using block chain. There are three (3) unique sub-steps that step 440 is conducting, in order to achieve the fractional ownership transfer on the block chain, without needing investor and platform to file paper deed with the county recorder office.

The first sub-step of step 440 is to create private block for Owner Smart Contract. One owner block will be created for each buyer/applicant and investor who does not exist in the Smart Contract/block chain network. If the block exists for the user, Smart Contract block will be updated. To determine if the user/contact exists, system verifies the identifiable number, such as Social Security Number, Tax Id, or Passport Country/Number. If not found, system creates the 'block' for the user and generates the unique owner 'public key' and 'private key'. User will be the only person that has the Private Key. Owner block hash key is then passed from server 108 and stored in storage device 114 that hosts various databases pertaining to real estate properties.

As second sub-step of step 440, when property closes escrow, as depicted in step 434, system first check if the Property Title block hash key exists in "Public block for Title". If it already exists, continue to update block chain. If it doesn't exist, continue to create/insert block for Property Title ownership data, as there can be only a single, unique block for each unique property legal address and system will generate property title public block Hash key. Various information of the property ownership will be stored, including deed, Trustee name and address, and property price purchased, trust information, as well as Equity Sharing Agreement terms. Property block hash key is then passed from server 108 and stored in storage device 114 that hosts various databases pertaining to real estate properties.

As third sub-step of step 440, for each investor's unique fractional ownership percentage and property purchase price, a new fractional property block will be created as fractional ownership information, which will require 'private key' to retrieve and update, in order to protect the identify and ownership from fraudulently transferred or sold. Fractional property block hash key is then passed from server 108 and stored in storage device 114 that hosts various databases pertaining to real estate properties.

In some embodiments, the method 400 also includes providing live stream and instruction of the property features. This includes clicking on the chatting and live-streaming screen on the portal, to allow for interacting with person conducting the live-stream, asking questions, and for entering 'number of equity' and displaying on the live-stream on a popup window, to complete the same process as described in FIG. 4 earlier. Investors can also link back to the non-live stream property page, review and invest. The live-stream may be conducted by a licensed real estate agent or broker. If the server 108 (platform) decides to purchase the property first, then the platform can employ own person to conduct 'for sale by owner' live-stream.

Figure 5:
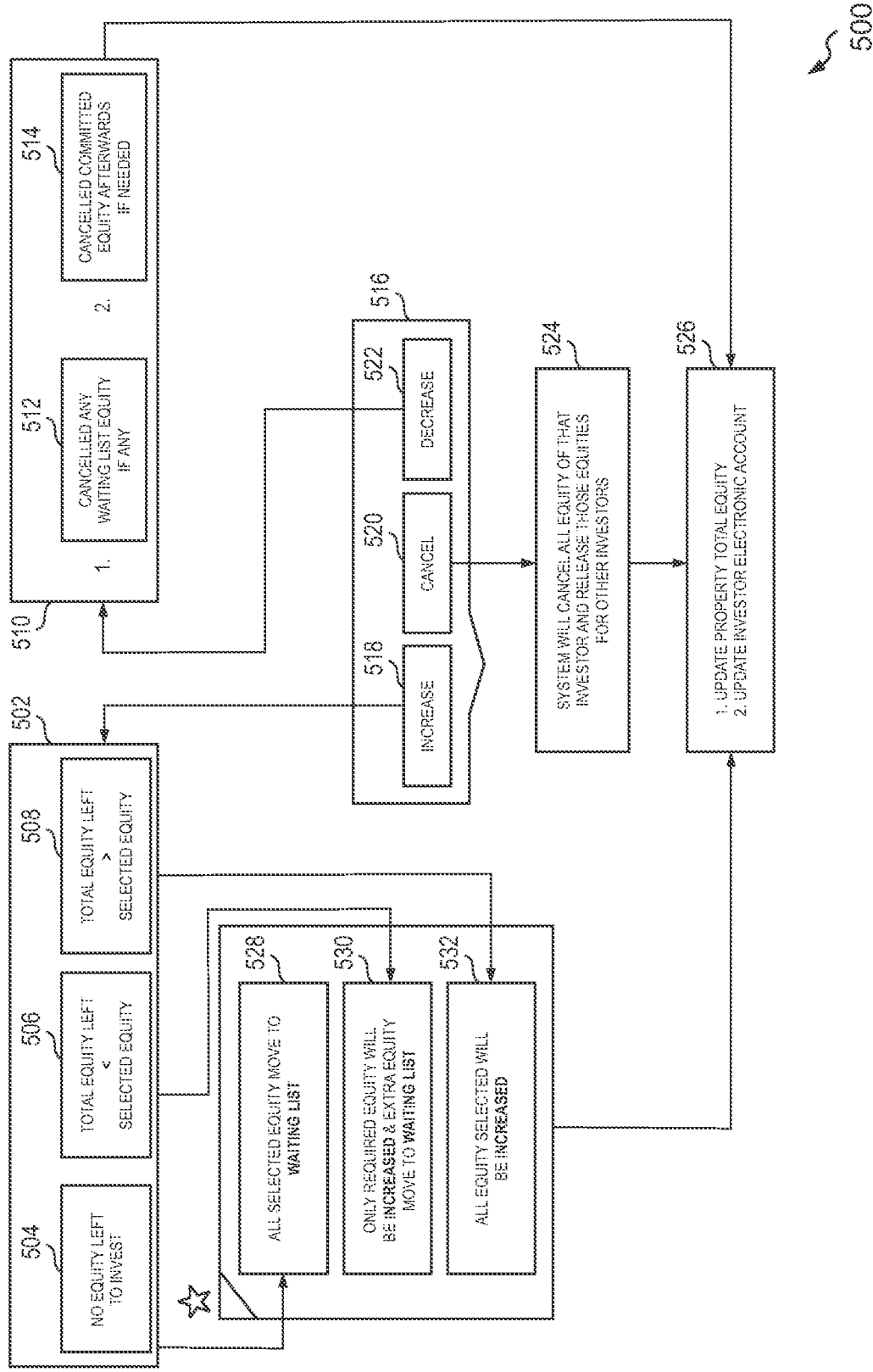
FIG. 5 is a flowchart of a method for performing commitment adjustment step of FIG. 4, according to the embodiments as disclosed herein.

FIG. 5 is a flowchart of a method 500 for performing commitment adjustment step 420 of FIG. 4, according to the embodiments as disclosed herein.

At step 516 (from step 420) an input is received from the investor to either increase (518), or cancel (520) or decrease (522) equity selected.

If the selection is to cancel, then at step 524, the server 108 verifies and allows investment to be cancelled subject to cancellation and refund rules. Once confirmed, it cancels all equity of that investor and releases those equities for other investors to invest. At step 526, the total equity of the property is updated and the electronic account of the investor is also updated.

If the selection is to decrease equity, then at step 510, the server 108 verifies and allows investment to be reduced subject to cancellation and refund rules. Once confirmed, then two things are done. First, any waiting list equity is canceled at step 512 and second, committed equity is cancelled afterwards if needed to match the decreased amount. The method 500 then moves to step 526.

If the selection is to increase, then at step 502, various sub-steps are performed. At step 504, a check is performed to determine if no equity is further left to invest and if so, then at step 528, all selected equity is moved to waiting list.

At step 506, a check is performed to determine if total equity left is less than the selected equity and if so, then at step 530, only required equity is increased and the extra equity is moved to the waiting list. At step 508, a check is performed to determine if total equity left is greater than selected equity and if so, then at step 532, all selected equity is increased. The method 500 then moves to step 526.

FIG. 6 is a flowchart of a method 600 for performing 'click and sign' fractional equity trading of real estate property, according to the embodiments as disclosed herein. Trading method 600 is for existing investors who had already participated and closed the purchase of the actual real estate property and now wants to sell fractional ownership using the system.

At step 602, a first/initiating investor (e.g., Investor 1) accesses the trading workflow of the portal by clicking on trading option. At step 604, various options including "open trades", "trade equity sharing property", "trade confirmation", "trade settlement", "open buy orders", "open sell orders" etc. are displayed to the first investor. The first investor selects the "trade equity sharing property" option.

At step 606, a check is performed to determine if the first investor has existing equity sharing ownership equity. If no, then at step 612, Investor 1 is allowed to submit only a 'buy trade'. Buying investor can assist or participate in 1031-exchange. When 'buy trade' is submitted, the method 600 moves to step 618.

If yes, which indicates existing ownership, at step 606, then the first investor has two options. If the first investor, at step 608, selects to buy additional equity, the method 600 moves to step 612. If the first investor, at step 610, selects submit 'sell trade' with price, and determine if wanting to participate in 1031-exchange then put the fractional ownership equity of the first investor for the other investor to purchase. Order submitted by the first investor is considered 'initiating order'. The method 600 then moves to step 616.

Step 614 precedes step 616 and step 618. At step 614, a second/matching investor (e.g., Investor 2) accesses the trading workflow of the portal by clicking on trading option. The second investor sees and opens buy orders at step 616. The second investor then clicks on matching order and confirms match trade at step 620. In some embodiments, the second investor also sees and opens sell orders at step 618 followed by confirming match order at step 620.

At step 622, couple of sub-steps (624 and 626) is performed. At step 626, if there is an exact matching of equity % between initiating order and matching order, then 624 is skipped and process moves to step 634. If equity % between the two orders is different, then process moves to step 624. At step 624, a trade order is split if equity involved in match order by the second investor (Investor 2) has submitted a different equity number than the initiating order by the first investor (Investor 1). The method 600 then moves to step 632 which has sub-step 628 (similar to step 616) and sub-step 630 (similar to step 618). The process is repeated for order that was split unless an exact matching is determined at step 626. At step 634, appraisal is ordered using API exposed by the server 108. The notification to confirm appraisal is then sent to the first investor at step 636 and to the second investor at step 638. At step 640, a decision or decisions are taken by checking whether appraised value is within threshold or higher than threshold or lower than threshold. The method 600 then moves to step 642 and is now explained in conjunction with FIG. 7.

In some embodiments, the equity trade matching algorithm (step 634) uses different levels of appraisals (automated valuation model, broker price opinion, desktop appraisal, full appraisal) and methods to determine the fractional property value, and confirm the validity and fair value of the trade. Types of appraisal required are automatically determined by total value of fractional equity value to be traded, as well as previous trading history of the subject property. For example, if there was a similar trade value recently performed and there is recent comparable appraisal for the same property that was traded, then the previous appraisal might be eligible for the new trade.

As not every trade might be matched successfully, to ensure lowest cost and feasibility/liquidity in digital exchange of fractional ownership equity, appraisal might be taken after trade is matched. Property equity trading is different from the stock trading since the value of the property is not as liquid and not easily determined by the open market and, instead, professional appraisal might be required and/or it is critical to implement approaches to protect the rights and interests of both selling investor (seller) and buying investor (buyer).

At step 702, if it is determined that the appraised value is within threshold and at step 704, the trade is automatically confirmed. At step 724, the trade settlement is performed by the server 108. The trade settlement includes e-signing of Beneficial Interest Assignment document at step 714, transferring fund directly between investor accounts at step 716, close equity trade at step 718, updating ownership to smart contract on block chain at step 720, and performing optional 1031-exchange at step 722, which will be explained in details under method 900.

At step 720, at the completion of trading when closing process is completed between matched 'Buy Trade' and 'Sell Trade', as depicted in step 718, platform will perform update to fractional property blocks for both buyer and seller. This step enables platform to record the conveyance of the fractional ownership between seller and buyer on the block chain, without the need to file paper deed with local county recorder office. Block chain fractional ownership data can be changed only when provides 'private key', since we are removing ownership from Seller digitally on the computer network, platform needs to verify the identity of the seller to safeguard the seller from unauthorized selling. Two (2) sub-steps to update ownership are performed: step 720 sub-step 1: update or create fractional property block for buying investor and step 720 sub-step 2: update fractional property block for selling investor.

At step 720 sub-step 1: update property block for buying investor, if the fractional property hash key does not exist, which indicates that the Buying investor does not currently own any fractional equity in the purchased property. If the fractional property hash key exists, then system will update, instead of creating, the property block. Prior to creating or updating the block, system will require 'Buying investor' to enter the 'Private Key' of the fractional property Smart Contract, since this step will be changing ownership on the existing block. After verification of identity, fractional ownership percentage, fractional purchase price, signature for accepting the Assignment of Beneficial Interest agreement and equity sharing agreement terms will be stored on the block.

At step 720 sub-step 2: update property block for selling investor: as fractional property block hash key always exists for selling investor, system will update, instead of creating, the fractional property block. Prior to updating the block, system will require 'Selling investor' to enter the 'Private Key' of the fractional property Smart Contract, since this step will be changing ownership on the existing block. After verification of identity, fractional ownership percentage, fractional purchase price, signature for transferring Assignment of Beneficial Interest agreement and equity sharing agreement terms will be stored on the block.

At step 706, if it is determined that the appraised value is higher than the threshold and at step 710, the trade first requires seller to agree to the trade value. Similarly, at step 708, it is determined that the appraised value is lower than the threshold and at step 710, the trade first requires buyer to agree to the trade value. If both the investors agree at step 712 then trade is confirmed and settlement is performed by the server 108 at step 724. If both investors do not agree at step 712 and, if appraised value is higher than the agreed trade value at step 726 and the seller investor does not agree to the trade value due to higher appraised value, then seller can submit counter offer at step 730 which is made available to the buyer investor at step 732. If the buyer investor declines the higher value proposed by seller at step 732, then at step 734 available options to the seller investor are provided. For example, at step 736, the seller investor has options of accepting lower trade value, declining the lower value and canceling the trade, or has an option to pay for second appraisal to raise the price of the trade. Based on the option selected, the method 700 moves to the step 724.

If appraised value is higher than the matched trade price, the platform gives seller an opportunity to decide if he/she is willing to sell at the lower price, so seller is protected by the online automation. If seller is unwilling to sell at the lower price, he/she can submit a 'counter offer' to buyer. If buyer does not agree to the counter offer, then seller can decide to cancel the trade or accept the original trade value.

If both investors do not agree at step 712 and if appraised value is lower than the agreed trade value at step 728, then the buyer investor can submit counter offer at step 730 which is made available to the seller investor at step 738. At step 738, available options to the seller investor are provided. For example, at step 740, the seller investor has options of accepting lower trade value, declining the lower value and canceling the trade, or has an option to pay for second appraisal to raise the price of the trade. Based on the option selected, the method 700 moves to the step 724.

If the appraised value is lower than the matched trade price, the platform (the server 108) gives buyer an opportunity to decide if he/she is willing to pay the higher price, so buyer is protected by the online automation. If buyer is unwilling to pay the higher price, he/she can submit a 'counter offer' to seller. If seller does not agree to the counter offer, then buyer can decide to cancel the trade or accept the original trade value.

In some embodiments, when the first investor wants to sell his/her equity, 'sell order' would be submitted and the method 600 or the method 700 will automatically determine the appraisal types required. When the second investor wants to purchase the same property, he/she would submit a 'buy order'. When two orders are matched, the platform (the server 108) will automatically create electronic trust beneficiary assignment document and require buyer investor, seller investor, and trustee to sign electronically, in order to transfer beneficiary interest under trust ownership. The platform will also then record the ownership change on block chain, which allows secure, verifiable, and instant transfer of fractional ownership interest between investors. This approach enables the first and only digital real estate ownership transfer, without using business entity such as LLC or REIT and without the need to file updated deed at county recorder office, which in turns reduces closing fee dramatically. Tax forms are automatically prepared for each investor; specifically, for non-US investors, automatically withholding processing are done through electronic documents and electronic faxing, and automatic withholding of payment and remittance of payment to IRS and local state tax authority.

FIG. 8 is a flowchart of a method 800 for paying out rental or money, according to the embodiments as disclosed herein.

The method 800 includes paying property expenses and paying net income to investors monthly, based on fractional ownership percentage, and requiring no manual intervention. The method 800 automatically sends all expenses related to the property (HOA due, homeowner insurance, appliance warranty, property tax) without any investor needing to perform any manual payment or worrying about cash flow. This assists investors, who own actual real estate, with automating the expenses and rental income payment, without the use of professional property manager.

The method 800 includes identifying concerned property at step 802. At step 804, escrow corresponding to the property is closed. At step 806, a payment schedule is created and entered into an expense management system at step 808. At step 810, the payment process is triggered followed by processing based on payment records type.

At step 812, active payment records with equity sharing ownership and that are due for payments are determined daily, followed by processing of these active payment records at step 814. At step 818, automatic ACH withdraw is processed followed by amount deposited from bank to owner/trustee wallet (marketplace online account dedicated to hold funds) at step 820. At step 822, ownership record is updated and occupant's monthly rental payment data is stored to block chain at step 824. At step 826, payout processing is started. At step 816, ACH clearing is verified. At step 826, all active investments are looped through for all investors with active equity ownership of the property being processed for payout.

At step 824, a check is performed daily to search for new payment made. Payment History, including amount paid, service fee, property expenses, and property taxes, from buyer/owner occupant will be updated to the private block for Owner Smart Contract, each time a monthly payment is completed. New payment history block will be created for each payment record for each buyer/owner occupant, and a new payment block hash key will be created. Payment block hash key is then passed from server 108 and stored in storage device 114 that hosts various databases pertaining to real estate properties.

At step 828, various payout records are created based on payout types at step 830. Two payout groups include ACH Payout Group and Check Payout Group. ACH Payout group include investor payout, profit share payout, trustee payout, service charge, non-sufficient fee, collection fee, admin fee, and account fee. Check Payout Group includes property tax, homeowner association fee, homeowner insurance, earthquake insurance, appliance warranty, and roof warranty.

At step 832, ACH API is used for processing automated ACH Payout Group and check API is used for processing Check Payout Group and automatically sending out paper checks to various recipients. At step 834, a check is made to determine if payouts are complete. If No, then the method 800 moves to step 812 else at step 836, payment is processed through trustee digital account. At step 838, fractional payment is received by the investor as US dollars or crypto currency.

FIG. 9 is a flowchart of a method 900 for fractional 1031-exchange property equity with 'drag and drop' replacement property identification form, according to the embodiments as disclosed herein.

The method 900 holds good for both initial property purchase or secondary equity trading—automatic matching between selling (relinquished) properties and buying (replacement) properties. The method 900 allows one-click and quickest, and most accurate matching and compliance for completing the 1301-exchange and deferring taxes, through the platform that manages ownership, full property or fractional ownership, for both selling and buying of real estate properties. As the marketplace (the portal) manages the 'equity ownership' of properties being bought and sold, it does not depend on any another system or any other third-party for information, such as replacement property price, closing time, compliance of 1031-exchange rules. The method 900 includes ability to process 1031-exchange without human intervention, by automated algorithm to automatically match selling property (relinquished property) with buying property (replacement property) and to determine the best closing date. Automatic matching of investment values is performed to ensure total replacement property values are greater than or equal to total relinquished property values, in order to meet the IRS requirements. The platform also allows multiple real estate properties to be added as replacement properties and allow 'drag and drop' to assign priority of the replacement, in the case when 45-day rule has passed and only three (3) replacement properties can qualify for 1031-exchange. The marketplace uses block chain to automate the exchange of fractional ownership interests by automatically verifying the owner identity and determining the property value.

The platform allows investor to complete a 1031-exchange using a single online screen to submit new replacement properties (buying trades) and the platform will automatically ensure that all replacement properties are adhering to three IRS requirements: '45-Day property identification rule', '180-Day replacement rule', and 'Trading up rule'.

An investor who wants to complete the 1031-exchange, would trade or sell the investment property in the same way as usual on the marketplace. The selling investor will sign a "1031 Exchange agreement" with a qualified intermediary who will then become the substitute seller to carry out the exchange. Marketplace will act as 'qualified intermediary' and automate the exchange for investors who are purchasing the replacement on the marketplace with the exception of properties located in Nevada, due to additional licensing requirement for qualified intermediary.

The property to be sold is called 'relinquished property'. During sale of property, selling investor will be asked if he/she is intending to process a 1031-exchange. The selling investor then will have two options to find 'replacement investment property':

Simultaneous exchange at the same time as the property sale:

At or prior to the completion of the 'property sale', selling investor identifies the replacement investment(s) through other investment properties offered at the marketplace. The 1031 exchange agreement will be signed by marketplace and selling investor. The 'relinquished property' would be sold and the fund from the sales will be used to purchase the 'replacement property'.

For 'Simultaneous exchange' to be valid, the closing dates of both relinquished property and replacement property are the same. For Non-US investor, this has a financial impact as 'Simultaneous Exchange' will NOT be subject to tax withholding. This holds well when the confirmed closing date for relinquished and replacement are same. The advantage of exchanging property at the equity sharing marketplace is that there is much more flexibility to intelligently set the closing date since both seller and buyer are the customers performing the transactions on single marketplace, which is not possible in any other places or systems.

Delayed exchange within 45 days after the sale completes:

Seller will not receive the sales proceed, as it will be held for 45 days under independent trustee account. If closing for any 'replacement investment property' completed after the closing for 'relinquished property' completed, then the exchange is considered a 'Delayed Exchange'. Replacement investment can be either from initial offering or secondary fractional trading to buy. If selecting 'initial offering' as replacement investment, the marketplace requires that the 'relinquished property" to be sold and the escrow is closed before 'replacement property' can be bought, which means that only 'Delayed Exchange' is possible. This ensures that the initial offering would not be impacted due to lack of funding, if the relinquished property is not sold for any reason.

In order to complete a 1031-exchange successfully on the marketplace, there are a few rules to follow:

45-Day property identification rule: replacement property must be at least identified before the end of the 45 calendar days Three-property rule—investor can identify any three like-kind properties regardless of investment value 200% rule—investor can identify more than three (3) replacement properties as long as their total value at the end of the 45-day identification period does not exceed 200% of the fair market value of the relinquished property. However, this rule is automatically resolved in the 1031-exchange on the marketplace, in some embodiments, since marketplace automatically set a limit of the number of replacement properties to three (3), if replacement investments are not closed within 45 days 95-percent Exception Rule—if the value exceeds 200 percent, then investor must purchase 95% of the aggregate investment value of all identified properties. However, this rule is also not applicable to the 1031-exchange on the marketplace, in some embodiments, since marketplace automatically set a limit of the number of replacement properties to three (3), if replacement investments are not closed within 45 days 180-Day Replacement Rule: Within 180 calendar days following the closing of the relinquished property or before the due date of the selling investor's tax return, the closing of all replacement investment properties must be completed.

Trading up rule: The total value of replacement properties must be equal to or greater than the relinquished property to qualify for 100% tax deferral. Otherwise, the selling investor needs to pay tax on the difference. It holds well when both loan and equity of the replacement investment are equal to or greater than the total equity of the relinquished investment in order to fully defer taxes from the sale of investment property.

The method 900 starts at step 902 when an equity sharing investor accesses the portal to sell fractional equity at step 904 and sign Property Trading Agreement at step 906. Method will ask investor whether or not to participate in 1031-exchange at step 908. If selecting 'No', then the method moves to step 910 to continue investment process. If selecting Yes, replacement property identification form is made available to investor, at step 912 for providing the replacement property. If such a replacement property is not identified and form is closed, then the method 900 moves back to step 910. Else if and when such replacement property is provided, then the method 900 moves to step 918 having sub-steps 914 and 916. At 914, replacement property is removed from the 1031-exchange and method 900 recalculates replacement property value. For step 916, 1031-exchange number is entered or replacement property address is entered.

At step 920, a check is performed for validating replacement property address and status of the property. If not found then the method 900 moves to step 910, else at step 922 and step 924 determination of from where the replacement property is performed. At step 922, it is determined that the replacement property is from "Buy trade" of existing equity sharing ownership property. The method 900 then moves to replacement property list processing at step 928 and 1031-exchange balance verification at step 930, which is a series of algorithm to verify various replacement values and dates in the existing 1031-exchange to ensure that all the IRS rules are followed, and then followed by step 910.

At step 924, it is determined that the replacement property is from new investment property not yet under equity sharing ownership. The method 900 then moves to step 926 in which it will enforce that only relinquished property is a sell trade property under equity sharing ownership qualified and the platform verifies that closing for the relinquished property has completed first, since fund from the sale proceeds need to be guaranteed. If not completed, then it should then move to step 914 to remove the replacement property and then move to step 910. If completed, then moves to step 928, followed by 930.

In some embodiments, non-marketplace home seller accesses the portal at step 932 and request 1031-exchange at step 934. The method 900 then skips step 906 and moves to step 908.

FIG. 10 is a flowchart of a method 1000 for detailed replacement list processing and 1031-exchange balance verification, according to the embodiments as disclosed herein. Investors are able to 'drag and drop' to remove or select the replacement properties that they want to be selected as the highest priority replacement.

At step 1002, which is a continuation of step 930, 1031-exchange balance verification is processed. At step 1006, the platform uses API to allocate the relinquished property sales proceed from intermediary bank account to replacement property, once escrow is closed. Step 1006 also includes several other sub-tasks:

Process withholding tax if 'simultaneous' 1031-exchange becomes 'delayed' 1031-exchange for Non-US person. This includes automatically determine Non-US person's withholding exemption status, withholding tax rate at federal and state level, the relinquished property cost basis, and calculate the amount required to be withheld.

Automatically update the total replacement property fund total whenever replacement investment is deleted from replacement property list or when it closes escrow, to ensure that total of replacement property investment allocated from sales proceeds less than or equal to the relinquished sale amount.

Automatically validate that 180-day rule is followed and replacement property closes escrow within 180-day of relinquished property escrow closes. If 180-day has passed, removes all replacement property that has not closed escrow, and process necessary withholding taxes for non-us investors.

When replacement property is going through closing process, automatically calculate any additional fund is required, if the total replacement investment amount is greater than the relinquished property amount.

Automatically close the 1031-exchange at 180-day after close of escrow for the relinquished property. If there is no qualified replacement property, cancel the 1031-exchange entirely.

At step 1004, which is a continuation of step 928, replacement property list is processed. At step 1010, if expected closing date for replacement property is less than expected closing date for relinquished property then replacement property is not eligible, if expected closing date for replacement property is greater than expected closing date for relinquished property then set 1031-exchange as 'delayed', and if expected closing date for replacement property is equal to expected closing date for relinquished property then 1031-exchange is classified as 'simultaneous'.

At step 1012, an algorithm to match closing date for replacement property and relinquished property is performed. This includes the platform to search for what are the easiest and least impacted transactions to align with the property closing date in the 1031-exchange, to increase the likelihood of closing the 1031-exchange simultaneously, asking corresponding buyer or seller if they are willing or flexible to move. For example, adjusting closing of buy trade (fractional ownership buy order) will be the first priority since it has the least impact to the success of the closing process.

At step 1014, 1031-exchange fund adjustment process is performed. At step 1016, method 1000 notifies investor and prompt to sign the 1031-exchange agreement electronically.

At step 1018, three-property rule is followed which includes only the first three replacement properties will be eligible for 1031-exchange if there are more than 45 days past the closing date of the relinquished property, auto-processing of replacement property as multiple replacement properties can be added, investor is capable of 'drag and drop' to select the top three (3) replacement properties to be eligible for 1031-exchange, and the platform will automatically sequence the replacement property list and select process the 1031-exchange based on the priority assigned and automatically remove all the other properties from the 1031-exchange, as well as recalculate the total replacement amount and release the fund back to investor.

FIG. 11 is a flowchart of a method 1100 for property expenses adjustment and rent stabilization, according to the embodiments as disclosed herein. The method 1100 is designed to handle expense adjustment, including updated county assessment record through expense management and apply refund or request additional money based on updated assessment for equity sharing. Equity sharing ownership brings additional complexity to the handling of property tax and necessary adjustment, since property tax and other housing expenses are only 'estimate' at the time of close escrow. The platform is designed as adjustment is required to either refund to occupant/owners (if estimate is higher than actual property tax) or to request additional payment (if estimate is lower than actual property tax). Additionally, if and when property taxes and other expenses increases in subsequent years, the method 1100 is implemented to automatically lower the service charge platform charges so the owner occupant continue to make the same payment and investors continue to receive the same net rental income during the entire equity sharing ownership. In some embodiments, there is an exception when there is extraordinary increase in property tax, then the cost may be passed to investors and occupant. The method 1100 enables housing cost to stay consistent and predictable, while guaranteeing the same consistent and fixed net rental income for investors. Since investors are entitled rental income during their ownership and rental income is paid 'in advance', when property equity is sold to another investor, the adjustment needs to be made to the rental income already by the selling investor from the previous rental payment date to the current settlement date of the trade. The amount needs to be taken out of selling investor to reimburse the buying investor. The same process needs to be performed for expenses, since selling investor was responsible for paying the fractional property expenses in advance, and the reverse needs to be done so buying investor is taking responsibility for the expenses that were considered selling investor's responsibility.

At either of steps 1102 or 1104 or 1106, tax assessment bill is received either from county tax collector, or as updated on block chain by county tax collector or property tax data is received from the third-party data provider.

At step 1108, property tax actual and other fields in ownership record are updated by admin/underwriter when bills are received. At step 1110, same information is inserted into expense change history table for audit purpose. At step 1112, a check is performed for already processes payment for ownership. At step 1114, property tax fields on transaction record are updated accordingly. At step 1116, property tax fields on ownership record are updated accordingly. At step 1118, property tax adjustment is made to occupant/owners. Also, other expenses adjustment is made to occupant and to investors.

At step 1120, existing payouts/investment records for investors are updated, in order to record the correct income and expenses from fractional ownership. At step 1122, future expenses and payouts are updated for investors.

At 1124, future tax payable is auto updated.

At step 1126, rent adjustment process is performed that includes calculation of increase in total property expense, lowering marketplace service fee by the corresponding increase in property tax and expenses, allocating property expense increases based on fractional equity ownership, and keeping the monthly rental payment stable and keeping investor rental income consistent.

FIG. 12 is a detailed view of a database 1200 stored in the storage device (114), according to the embodiments as disclosed herein.

The database 1200 includes various data related to the property stored in a structured manner. The database 1200 includes profile management data that includes company data 1230, contact profile 1232, and contract 1234. The profile management data is accessible by buyer application 1202 or investor application 1204. The buyer application 1202 and the investor application 1204 are part of the portal and runs on the server 108.

The buyer application 1202 can create and view, and the investors application 1204 can view and invest/trade using various data such as listing 1206, application 1208, offer 1210, offering 1212, closing 1214, property 1220, property school 1222, school 1224, private offering 1226, and valuation 1228. The database 1200 also includes capitalization 1216 and capitalization history 1218 linked to the property 1220.

The database 1200 also includes payment schedule and payout management data including property history 1250, payout 1252, payment schedule 1254, tax schedule 1256, and expense change history 1258.

The database 1200 also includes search and inquiry management data including search 1240, saved search 1242, saved property 1244, and inquiry 1246.

The database 1200 also includes electronic account management data including wallet 1236, and bank account 1238.

The database 1200 also includes document management data including document 1248.

The database 1200 also includes investment and trading management data including investment 1260, transaction 1262, replace property 1264, and 1031-exchange 1266.

Finally, the database 1200 also includes application helper tables including withholding tax 1268, recording escrow 1270, free setup 1272, free type 1274, zip median 1276, zip median per square feet 1278, quoting rule 1284, ACH limit 1282, and insurance estimate 1280.

FIG. 13 is a flow diagram 1300 illustrating property title ownership updates and monthly payment history updates using smart contract and block chain, according to the embodiments as disclosed herein.

At 1302, the seller accesses a portal such as Zeehaus private exchange access at step 1304. At step 1306, fiat or crypto currency is transferred to seller from buyer, when seller and buyer complete the property closing and buyer receives the ownership.

At step 1312, monthly payment is processed from owner occupant to investors, and rental payment history is stored to the Zeehaus smart contract. This process is not possible in existing freehold ownership or rental property. By storing payment history on block chain, it is verifiable with the permission/private key of the owner occupant for future mortgage refinance request. Mortgage refinance marketplace is shown as 1314, and mortgage company will be able to validate on-time payments of the owner occupant, while occupant will be able to leverage Equity Sharing ownership to help improve the chance of mortgage refinance success. At step 1308, title registry smart contract is conducting verification on existing ownership on decentralized block chain. 1310 shows smart contract verifies ownership and updates the block chain with change of ownership, property sales price, fractional ownership %.

At 1316, secondary approval is received from county recorder office. This step is only required if the entire property is transferred either into equity sharing ownership or out of equity sharing ownership, and it requires the county recorder office to confirm that the title is transferred and recorded officially.

FIGS. 14-21 are snapshots of user interface provided by a portal, according to the embodiments as disclosed herein.

Snapshot 1400 shows property listing information displayed on the portal.

Snapshot 1500 shows further property details as seen by buyer or investor and both can submit the property for purchase or investment by entering address.

Figure 18A:
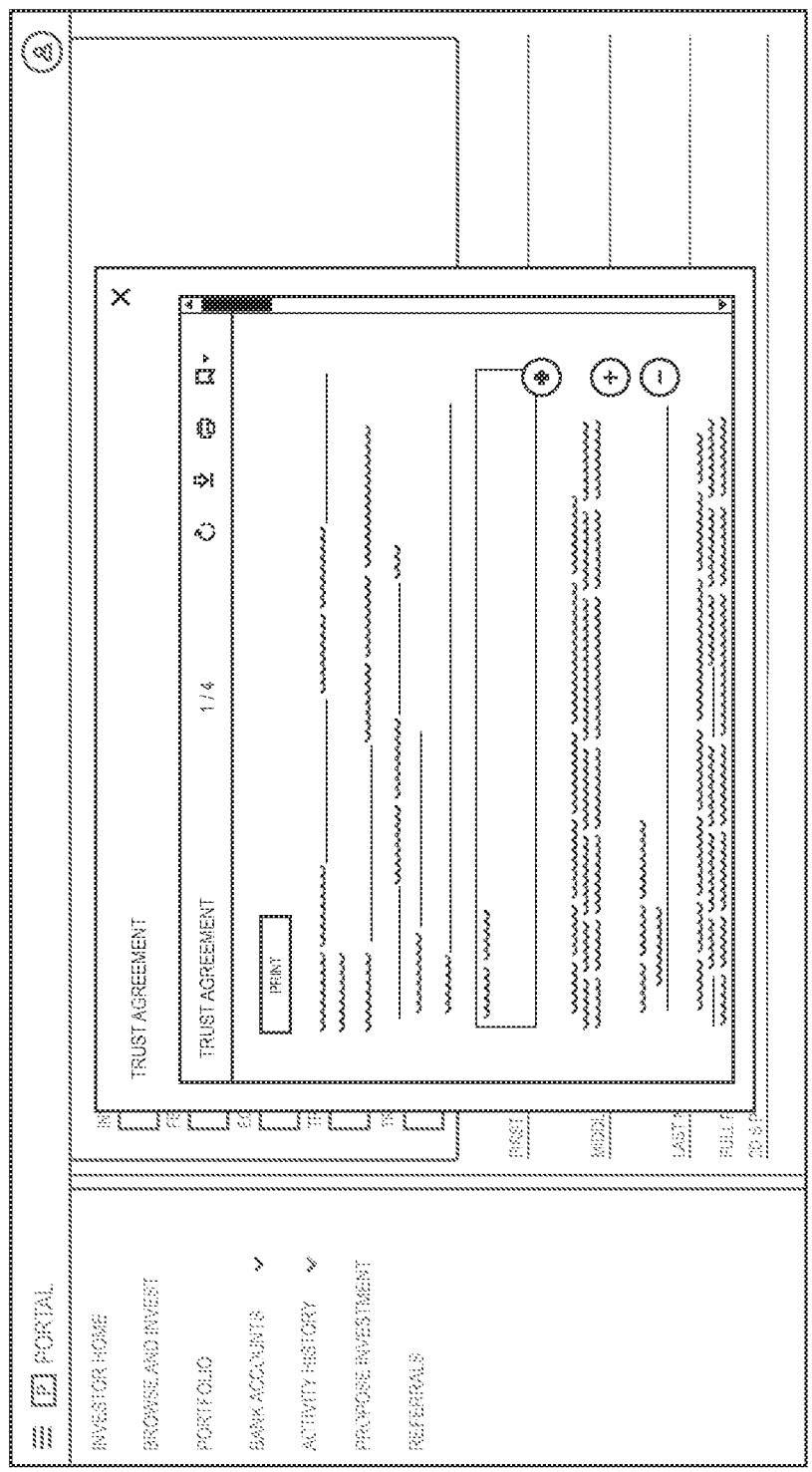
Figure 18B:
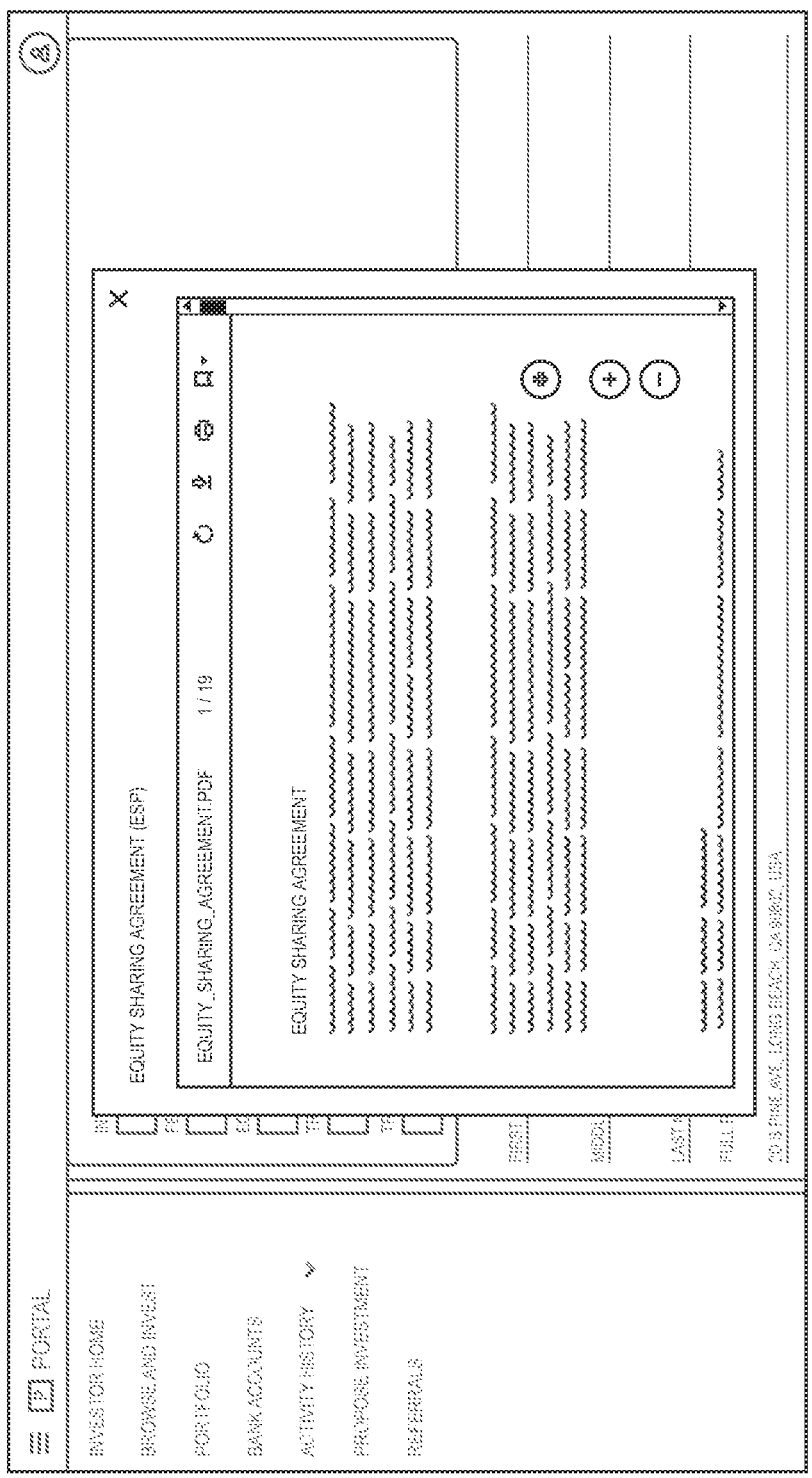
Figure 23:
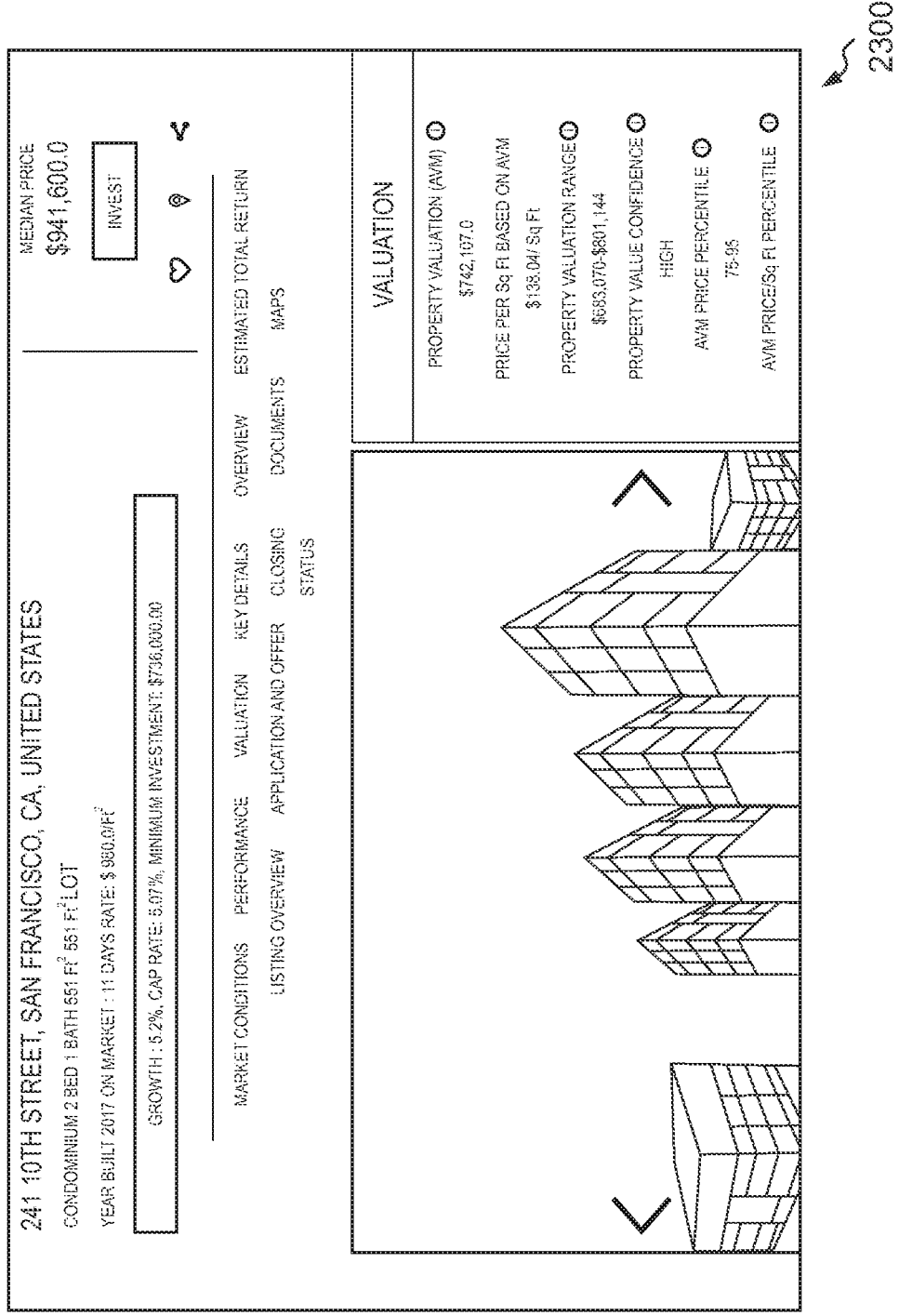

Snapshot 1600 shows the portal as seen by the investor using browse and invest tab. 'Invest' is the first step of the digital real estate purchase process Snapshot 1700 shows further data such as offering terms, investment commitment etc. as seen by investor. 'Invest Now' is the second step of the digital real estate purchase process Snapshot 1800A shown in FIG. 18A shows e-signing Trust Agreement and snapshot 1800B shown in FIG. 18B show Equity Sharing Agreement, as seen by investor. 'Sign' is the third and last step of the digital real estate purchase process.

Snapshot 1900 shows view visible to the investor under portfolio tab, which allows investor to increase, decrease, or cancel investment as described in method 500, step 516.

Snapshot 2000 shows further details of tracking statuses of investment, awaiting closing, active/open offering, active investment etc. visible under the portfolio tab. It also shows the 'Trade' features as a first step to perform 'fractional equity trading'.

Snapshot 2100 shows combined trading step 2 and step 3 to complete the 'trade confirmation' process.

FIGS. 22-26 are snapshots of investment commitment process details provided by the portal, according to the embodiments as disclosed herein.

Snapshot 2200 shows property searching options available to investor to facilitate the investment selection and experience.

Snapshot 2300 shows view of a property and its key data.

Snapshot 2400 shows further data related to property like forecast, market conditions and property performance Snapshot 2500 shows simulated investment return associated with the property, with investor adjusting the number of equity shares invested.

Snapshot 2600 shows screen for agreeing to invest or willing to participate in 1031-exchange, along with search form to find active 1031-exchange and replacement property by entering either 1031-exchange number or property address.

Snapshots 3200A and 3200B, as shown in FIGS. 32A and 32B show screens for replacement property process.

FIG. 27 is a flow diagram 2700 illustrating overall working and integrated view of the environment 100, according to the embodiments as disclosed herein.

Block 2722 corresponds to buyer dashboard and indicates workflows of the buyer (e.g., 2724) such as completing property application and submitting property, financial application to be approved automatically or for underwriter review.

Block 2702 shows property review and approval process, which is described in method 200 and 300. Block 2704 corresponds to underwriter who is required for approving the application, if necessary.

Block 2708 corresponds to investor role and Block 2706, which is described in method 400 and 500, shows workflows associated with the investor participating in an offering and committing the fund transfer processing, including ACH and wire.

Block 2710 corresponds to investor 2716, buyer 2714, and trustee 2712, and shows three parties coordinating to complete digital closing, including contracts signing, viewing status, and performing closing tasks, a described in method 400

Block 2718 correspond to investor dashboard that provides options to the investor to manage portfolio and perform trade, as described in method 500, 600, 700, 800, 900, and 1000.

Block 2720 correspond to expense management block including auto processing of payments and expenses by number of shares owned, as described in method 1100.

Flow diagram 2700 also shows one integrated system (platform enabled) that has multiple capabilities and offers workflows for buyer, investor, trustee etc. to enable fractional equity sharing transaction for a single property.

In some embodiments, the platform enables homeowners to submit how much rent they would like to pay investors and how much equity ownership to sell to investor, through the use of option contract (Name Your Own Payment method). System will intelligently calculate how much future equity each investor and existing homeowner should be entitled to. The higher the monthly payment homeowner is willing to pay to the investor, the smaller the future equity homeowner needs to give up. The formula also takes into account how much equity current homeowner would have in the property, after the option contract; the higher the risk (lower equity), the higher amount of future equity will need to give up to the investors.

Logic:

verify that Owner Name, Mortgage Amount checks using third party APIs determine Existing Equity Percentage (Total Equity/Property Value)

The platform calculates % of investor equity that applicant (homeowner or buyer is willing to share with investor), based on what applicant enters in the monthly payment. Below is an illustration (but actual % and calculation would change based on the risk profile of the property equity and applicant income/credit score).

if applicant has 15% to 40% as "Existing Equity Percentage", the most applicant can borrow (max Requested Equity %)=Existing Equity Percentage−10%, but Max Requested Equity % has to be <=20% if applicant has 41% to 100% as "Existing Equity Percentage", the applicant can borrow (Requested Equity %) between 5% to 20% example: If applicant has 60% as "Existing Equity Percentage" and tries to borrow 15% (Requested Equity %)

Equity Percentage=60%

Requested Equity % (always equals Investor Equity) =15%

Owner Equity %=Equity Percentage−Requested Equity %=60%−15%=45%

"Max Appreciation Growth %"=greater of (Requested Equity %/Equity Percentage, 2*Requested Equity %)

=greater of (15%/60%, 30%)=30%, so we set 'Max Appreciation Growth %'=30%

When Monthly Payment=0% of amount borrowed, Appreciation Growth % is always='Max Appreciation Growth %'=30%

Now find out Min Appreciation Growth %

=greater of "Requested Equity %" and ("Max Appreciation Growth %"−Requested Equity %)

in this case, greater of 15% and (30%−15%)

So, Min Appreciation Growth %=15%

If Monthly Payment=3% of amount borrowed, Appreciation Growth % becomes 15% (Min Appreciation Growth %)

Default 3% to be the "maximum Interest Rate"

Now we can build the scale to show corresponding Monthly Payment (min of $0 and max of 3%) and Appreciation Growth (max and min)

Appreciation Growth %=Max Appreciation Growth %−[(Max Appreciation Growth %−Min Appreciation Growth %)/"maximum Interest Rate"*Monthly Payment %]

If Monthly Payment %=2% of amount borrowed:
In this case=30%−[(30%−20%)/3*2]=30%−6.6%=23.3%

If Monthly Payment %=1% of amount borrowed:
In this case=30%−[(30%−20%)/3*1]=30%−3.3%=26.7%

FIG. 28 is a block diagram illustrating a device such as buyer device or investor device, according to the embodiments as disclosed herein. FIG. 28 is a block diagram of the device in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 2800 includes a processor 2802 (e.g., a central processing unit (CPU), a graphics processing unit (GPU), or both), a main memory 2804, and a static memory 2806, which communicate with each other via a bus 2808. The computer system 2800 may further include a video display unit 2810 (e.g., a liquid crystal display (LCD) or a cathode ray tube (CRT)). The computer system 2800 also includes an alphanumeric input device 2812 (e.g., a keyboard), a user interface (UI) navigation device 2814 (e.g., a mouse), a disk drive unit 2816, a signal generation device 2818 (e.g., a speaker), and a network interface device 2820.

Machine-Readable Medium

The disk drive unit 2816 includes a machine-readable medium 2822 on which is stored one or more sets of data structures and instructions 2824 (e.g., software) embodying or utilized by any one or more of the methodologies or functions described herein. The instructions 2824 may also reside, completely or at least partially, within the main memory 2804 and/or within the processor 2802 during execution thereof by the computer system 2800, the main memory 2804 and the processor 2802 also constituting machine-readable media.

While the machine-readable medium 2822 is shown in an example embodiment to be a single medium, the term "machine-readable medium" may include a single medium or multiple medium (e.g., a centralized or distributed database, and/or associated caches and servers) that store the one or more instructions 2824 or data structures. The term "non-transitory machine-readable medium" shall also be taken to include any tangible medium that is capable of storing, encoding, or carrying instructions for execution by the machine and that cause the machine to perform anyone or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 2824 may further be transmitted or received over a computer network 2850 using a transmission medium. The instructions 2824 may be transmitted using the network interface device 2820 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as ReactJS, Ruby, Redux, NodeJS, Python, C, C++, C#, Pascal, Fortran, Perl, Matlab (from Math Works), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its sub-standards a, b, e, g, h, i, n, et al.). In one example, signals from the computer can be transferred, at least in part, wirelessly to components or other computers.

FIG. 29 is a block diagram of a server, for example the server 108 or the Buyer/Trustee Server 110, in the example form of a computer system within which instructions for causing the machine to perform any one or more of the methodologies discussed herein may be executed. In alternative embodiments, the machine operates as a standalone device or may be connected (e.g., networked) to other machines. In a networked deployment, the machine may operate in the capacity of a server or a client machine in a server-client network environment, or as a peer machine in a peer-to-peer (or distributed) network environment. Further, while only a single machine is illustrated, the term "machine" shall also be taken to include any collection of machines that individually or jointly execute a set (or multiple sets) of instructions to perform any one or more of the methodologies discussed herein.

The example computer system 2900 includes a processor 2902 (e.g., a central processing unit (CPU), a graphics processing unit (GPU), or both), a main memory 2904, and a static memory 2906, which communicate with each other via a bus 2908. The computer system 2900 may further include a video display unit 2910 (e.g., a liquid crystal display (LCD) or a cathode ray tube (CRT)). The computer system 2900 also includes an alphanumeric input device 2912 (e.g., a keyboard), a user interface (UI) navigation device 2914 (e.g., a mouse), a disk drive unit 2916, a signal generation device 2918 (e.g., a speaker), and a network interface device 2920.

Machine-Readable Medium

The disk drive unit 2916 includes a machine-readable medium 2922 on which is stored one or more sets of data structures and instructions 2924 (e.g., software) embodying or utilized by any one or more of the methodologies or functions described herein. The instructions 2924 may also reside, completely or at least partially, within the main memory 2904 and/or within the processor 2902 during execution thereof by the computer system 2900, the main memory 2904 and the processor 2902 also constituting machine-readable media.

While the machine-readable medium 2922 is shown in an example embodiment to be a single medium, the term "machine-readable medium" may include a single medium or multiple medium (e.g., a centralized or distributed database, and/or associated caches and servers) that store the one or more instructions 2924 or data structures. The term "non-transitory machine-readable medium" shall also be taken to include any tangible medium that is capable of storing, encoding, or carrying instructions for execution by the machine and that cause the machine to perform anyone or more of the methodologies of the present subject matter, or that is capable of storing, encoding, or carrying data structures utilized by or associated with such instructions. The term "non-transitory machine-readable medium" shall accordingly be taken to include, but not be limited to, solid-state memories, and optical and magnetic media. Specific examples of non-transitory machine-readable media include, but are not limited to, non-volatile memory, including by way of example, semiconductor memory devices (e.g., Erasable Programmable Read-Only Memory (EPROM), Electrically Erasable Programmable Read-Only Memory (EEPROM), and flash memory devices), magnetic disks such as internal hard disks and removable disks, magneto-optical disks, and CD-ROM and DVD-ROM disks.

Transmission Medium

The instructions 2924 may further be transmitted or received over a computer network 2950 using a transmission medium. The instructions 2924 may be transmitted using the network interface device 2920 and any one of a number of well-known transfer protocols (e.g., HTTP). Examples of communication networks include a local area network (LAN), a wide area network (WAN), the Internet, mobile telephone networks, Plain Old Telephone Service (POTS) networks, and wireless data networks (e.g., WiFi and WiMAX networks). The term "transmission medium" shall be taken to include any intangible medium that is capable of storing, encoding, or carrying instructions for execution by the machine, and includes digital or analog communications signals or other intangible media to facilitate communication of such software.

As described herein, computer software products can be written in any of various suitable programming languages, such as ReactJS, Ruby, Redux, NodeJS, Python, C, C++, C#, Pascal, Fortran, Perl, Matlab (from Math Works), SAS, SPSS, JavaScript, AJAX, and Java. The computer software product can be an independent application with data input and data display modules. Alternatively, the computer software products can be classes that can be instantiated as distributed objects. The computer software products can also be component software, for example Java Beans or Enterprise Java Beans. Much functionality described herein can be implemented in computer software, computer hardware, or a combination.

Furthermore, a computer that is running the previously mentioned computer software can be connected to a network and can interface to other computers using the network. The network can be an intranet, internet, or the Internet, among others. The network can be a wired network (for example, using copper), telephone network, packet network, an optical network (for example, using optical fiber), or a wireless network, or a combination of such networks. For example, data and other information can be passed between the computer and components (or steps) of a system using a wireless network based on a protocol, for example Wi-Fi (IEEE standard 802.11 including its sub-standards a, b, e, g, h, i, n, et al.). In one example, signals from the computer can be transferred, at least in part, wirelessly to components or other computers.

It is to be understood that although various components are illustrated herein as separate entities, each illustrated component represents a collection of functionalities which can be implemented as software, hardware, firmware or any combination of these. Where a component is implemented as software, it can be implemented as a standalone program, but can also be implemented in other ways, for example as part of a larger program, as a plurality of separate programs, as a kernel loadable module, as one or more device drivers or as one or more statically or dynamically linked libraries.

FIG. 30 a flowchart of a method 3000 for illustrating sequential view of the environment 100 for equity sharing of a property, according to the embodiments as disclosed herein.

The method starts at step 3002. At step 3004, details of a property inputted by a user are received. The user can be a seller, a buyer or an investor.

In some embodiments, the method also includes conducting property certification algorithm, including checking for busy road and recent sales through API and complete due-diligence.

At step 3006, the property is shortlisted for funding once score of the property is greater than a threshold.

At step 3008, the property is divided into a plurality of equity shares, wherein each equity share indicates a fraction of ownership of the property.

At step 3010, equity rate is determined, wherein the equity rate is rate for each equity share that buyer is paying investor for the right of solely occupying property.

At step 3012, an input is received from an investor searching for the property.

At step 3014, an option is provided to the investor to purchase one or more equity shares. In some embodiments, providing option to the investor to purchase one or more equity shares includes providing interactive live-stream computer user interface or static computer user interface.

At step 3016, indication of number of equity shares to be purchased by the investor is received.

At step 3018, the amount to be paid by the investor is determined based on number of equity shares and the equity rate.

At step 3020, the amount is transferred from the investor to owner/trustee wallet (marketplace online account dedicated to hold funds). In some embodiments, the amount is transferred to investor wallet through third-party API.

At step 3022, ownership data including fractional ownership of the investor based on number of equity shares purchased by the investor is stored. In one embodiment, the data is stored in a block chain. The storing also includes storing changes to ownership.

The method stops at step 3024.

In various embodiments, the method 3000 also includes electronically signing trust agreement an equity sharing agreement by the investor and the user. The method also includes providing option to the investor to offer purchased equity shares for selling, and updating ownership data based on selling of number of shares by the investor and purchasing of the number of shares by another investor. The method 3000 also includes determining an appraisal value for the investor for the equity shares offered for selling, comparing the appraisal value with a trade value offered by the other investor, and providing an assessment of the appraisal value against the trade value to both the investor and the other investor. Further, the method 3000 includes providing option to both the investor and the other investor to provide counter offer. The method 3000 also includes providing option to the investor to increase, decrease, or cancel number of equity shares after receiving indication of the number of equity shares to be purchased by the investor. The method also includes paying property expenses through third-party Check API, including property tax, homeowner insurance, homeowner association due, and appliance warranty through third-party API; and performing automatic property expense adjustment, due to multiple owners in equity sharing ownership.

FIG. 31 is a flowchart of another method 3100 for illustrating high-level processes of the environment 100 for equity sharing of the property, according to the embodiments as disclosed herein.

At step 3110, property listing is submitted via an application.

At step 3120, the application is pre-approved and the property is certified.

At step 3130, the investors offer to buy equity shares in the property and contracting process is triggered in response to the offer.

At step 3140, the closing process is performed.

At step 3150, the escrow is closed.

At step 3160, account management is performed.

As will be understood by those familiar with the art, the invention may be embodied in other specific forms without departing from the spirit or essential characteristics thereof. Likewise, the particular naming and division of the portions, modules, agents, managers, components, functions, procedures, actions, layers, features, attributes, methodologies and other aspects are not mandatory or significant, and the mechanisms that implement the invention or its features may have different names, divisions and/or formats.

Furthermore, as will be apparent to one of ordinary skill in the relevant art, the portions, modules, agents, managers, components, functions, procedures, actions, layers, features, attributes, methodologies and other aspects of the invention can be implemented as software, hardware, firmware or any combination of the three. Of course, wherever a component of the present invention is implemented as software, the component can be implemented as a script, as a standalone program, as part of a larger program, as a plurality of separate scripts and/or programs, as a statically or dynamically linked library, as a kernel loadable module, as a device driver, and/or in every and any other way known now or in the future to those of skill in the art of computer programming Additionally, the present invention is in no way limited to implementation in any specific programming language, or for any specific operating system or environment.

Furthermore, it will be readily apparent to those of ordinary skill in the relevant art that where the present invention is implemented in whole or in part in software, the software components thereof can be stored on computer readable media as computer program products. Any form of computer readable medium can be used in this context, such as magnetic or optical storage media. Additionally, software portions of the present invention can be instantiated (for example as object code or executable images) within the memory of any programmable computing device.

Accordingly, the disclosure of the present invention is intended to be illustrative, but not limiting, of the scope of the invention, which is set forth in the following claims.

What is claimed is:

1. A computer-implemented method for buying and selling fractional real estate through equity sharing of a property digitally on a computer network, wherein the buying and selling is implemented using a real estate portal, the method comprising executing on a processor the steps of:

receiving, by the processor of a server from a user device, details of the property inputted by a user by accessing a real estate portal displayed on the user device;

short listing, by the processor of the server, the property for funding based on inputs retrieved by the processor from a database including data related to the property stored in a storage device associated with data providers by calculating a noise factor and a property score, wherein the data related to the property includes one or more physical parameters related to the property, wherein the noise factor and the property score are calculated by analyzing the one or more physical parameters such as roads and places in a close vicinity of the property, and wherein the property is shortlisted when the property score is greater than a threshold;

dividing, by the processor of the server, the property into a plurality of equity shares, wherein each equity share indicates a fraction of ownership of the property;

determining, by the processor of the server, an equity rate, wherein the equity rate is rate for each equity share;

receiving, by the processor of the server, an input from an investor searching for the property through a user interface displayed on an investor device and provided by the real estate portal;

providing, by the processor of the server through the real estate portal, an option to the investor to purchase one or more equity shares;

receiving, by the processor of the server, an indication of a number of equity shares to be purchased by the investor;

determining, by the processor of the server, a purchase amount to be paid by the investor based on the indicated number of equity shares to be purchased and the equity rate;

purchasing, by the investor through the real estate portal, the indicated number of equity shares by transferring the purchase amount to a seller;

transferring, by the user through a trust server connected to a storage device, a property user fee amount to a trust, wherein the storage device stores documents or data related to the trust; and storing, by the processor of the server, ownership data including fractional ownership of the investor information based on the number of equity shares purchased by the investor in a block chain, wherein storing the ownership data comprises:

generating, by the processor of the server, a private block for property title ownership data including a public key and a private key, wherein the public key is known both to the investor and the user, and wherein the private key is known only to the user, inserting, by the processor of the server, the private block for the property title ownership data in the block chain, generating, by the processor of the server, a new fractional property block for the fractional ownership of the investor information, changing, by the user using the private key, by the processor of the server, the fractional ownership of the investor information to a user information, and inserting, by the processor of the server, the new fractional property block in the block chain.

2. The method as claimed in claim 1, further comprising:
executing property certification algorithm including checking for busy roads and recent sales through an application programming interface (API); and
completing due-diligence.

3. The method as claimed in claim 1, wherein the equity rate is a rate for each equity share that the user is paying the investor for the right of solely occupying property.

4. The method as claimed in claim 1, wherein transferring the property user fee amount to the trust comprises transferring the property user fee amount to an investor wallet through a third-party application programming interface (API).

5. The method as claimed in claim 1, wherein providing the option to the investor comprises an option to purchase the one or more equity shares through an interactive live stream computer user interface or a static computer user interface.

6. The method as claimed in claim 1, further comprising:
paying, by the processor of the server, property expenses through a third-party check application programming interface (API) including property tax, homeowner insurance, homeowner association due, and appliance warranty through a third-party API; and
performing, by the processor of the server, automatic property expense adjustment due to multiple owners in equity sharing ownership.

7. The method as claimed in claim 1, wherein the user comprises at least one of: a buyer, a seller, and another investor.

8. The method as claimed in claim 1, further comprising:
electronically signing a trust agreement and an equity sharing agreement by the investor and the user.

9. The method as claimed in claim 1, further comprising:
providing, by the processor of the server through the real estate portal, an option to a homeowner to submit how much rent they would like to pay investors and to compute how much equity ownership to grant to investor in exchange for funding from investor.

10. The method as claimed in claim 1, further comprising:
providing, by the processor of the server through the real estate portal, an option to the investor to increase, decrease, or cancel the number of equity shares after receiving the indication of the number of equity shares to be purchased by the investor.

11. The method as claimed in claim 1, further comprising:
providing, by the processor of the server through the real estate portal, an option to the selling investor to conduct automated matching of a selling property with a buying property.

12. The method as claimed in claim 1, further comprising:
providing, by the processor of the server through the real estate portal, an option to the investor to conduct fractional equity trading of real estate property ownership by offering the number of equity shares for sale digitally on the computer network; and
updating, by the processor of the server, ownership data based on selling the number of equity shares by the investor and purchasing the number of equity shares by another investor.

13. The method as claimed in claim 12, further comprising:
determining, by the processor of the server, an appraisal value of the number of equity shares offered for sale by the investor;
comparing, by the processor of the server, the appraisal value of the number of equity shares offered for sale with a trade value offered by the other investor to buy the offered number of equity shares;
providing, by the processor of the server, an assessment of the appraisal value against the trade value to both the investor and the other investor; and
matching, by the processor of the server, the offer to buy with the offer to sell including exact matching and split matching, to complete closing of the fractional equity trading of real estate property ownership without the need of a third-party intervention.

14. The method as claimed in claim 13, further comprising:
providing, by the processor of the server through the real estate portal, an option to both the investor and the other investor to provide a counter offer.

15. A system comprising:
a memory configured to store instructions; and
a processor configured to execute the stored instructions, the stored instructions comprising:
receiving, from a user device, details of the property inputted by a user by accessing a real estate portal displayed on the user device;
short listing the property for funding based on inputs retrieved by the processor from a database including data related to the property stored in a storage device associated with data providers by calculating a noise factor and a property score, wherein the data related to the property includes one or more physical parameters related to the property, wherein the noise factor and the property score are calculated by analyzing the one or more physical parameters such as roads and places in a close vicinity of the property, and wherein the property is shortlisted when the property score is greater than a threshold;
dividing the property into a plurality of equity shares, wherein each equity share indicates a fraction of ownership of the property;
determining equity rate, wherein the equity rate is rate for each equity share;
receiving an input from an investor searching for the property through a user interface displayed on an investor device and provided by the real estate portal;
providing, through the real estate portal, an option to the investor to purchase one or more equity shares;
receiving an indication of a number of equity shares to be purchased by the investor;
determining a purchase amount to be paid by the investor based on the indicated number of equity shares to be purchased and the equity rate;
purchasing, by the investor through the real estate portal, the indicated number of equity shares by transferring the purchase amount to a seller;
transferring, by the user through a trust server connected to a storage device, a property user fee amount to a trust, wherein the storage device stores documents or data related to the trust; and
storing ownership data including fractional ownership of the investor information based on the number of equity shares purchased by the investor in a block chain, wherein storing the ownership data comprises:
generating a private block for property title ownership data including a public key and a private key, wherein the public key is known both to the investor and the user, and wherein the private key is known only to the user, inserting the private block for the property title ownership data in the block chain, generating a new fractional property block for the fractional ownership of the investor information, changing, by the user using the private key, the fractional ownership of the investor information to a user information, and inserting the new fractional property block in the block chain.

16. The system as claimed in claim 15, wherein the user comprises at least one of: a buyer, a seller, and another investor.

17. The system as claimed in claim 15, wherein the stored instructions further comprise:

electronically signing a trust agreement and an equity sharing agreement by the investor and the user.

18. The system as claimed in claim 15, wherein the stored instructions further comprise:

providing through the real estate portal, an option to the investor to offer the number of equity shares for sale; and updating ownership data based on selling the number of equity shares by the investor and purchasing the number of equity shares by another investor.

19. The system as claimed in claim 18, wherein the stored instructions further comprise:

determining an appraisal value of the number of equity shares offered for sale by the investor;

comparing the appraisal value of the number of equity shares offered for sale with a trade value offered by the other investor to buy the offered number of equity shares; and providing an assessment of the appraisal value against the trade value to both the investor and the other investor.

20. The system as claimed in claim 19, wherein the stored instructions further comprise:

providing, through the real estate portal, to both the investor and the other investor to provide a counter offer.

21. The system as claimed in claim 15, wherein stored instructions further comprise:

providing, through the real estate portal, an option to the investor to increase, decrease, or cancel the number of equity shares after receiving the indication of the number of equity shares to be purchased.

22. A non-transitory computer-readable storage medium storing one or more programs, the one or more programs comprising instructions which when executed by a processor, cause the processor to:

receive, from a user device, details of the property inputted by a user by accessing a real estate portal displayed on the user device;

short list the property for funding based on inputs retrieved by the processor from a database including data related to the property stored in a storage device associated with data providers by calculating a noise factor and a property score, wherein the data related to the property includes one or more physical parameters related to the property, wherein the noise factor and the property score are calculated by analyzing the one or more physical parameters such as roads and places in a close vicinity of the property, and wherein the property is shortlisted when the property score is greater than a threshold;

divide the property into a plurality of equity shares, wherein each equity share indicates a fraction of ownership of the property;

determine an equity rate, wherein the equity rate is rate for each equity share;

receive an input from an investor searching for the property through a user interface displayed on an investor device and provided by the real estate portal;

provide, through the real estate portal, an option to the investor to purchase one or more equity shares;

receive an indication of a number of equity shares to be purchased by the investor;

determine a purchase amount to be paid by the investor based on the indicated number of equity shares to be purchased and the equity rate;

purchase, by the investor through the real estate portal, the indicated number of equity shares by transferring the purchase amount to a seller;

transfer, by the user, a property user fee amount to a trust, wherein the storage device stores documents or data related to the trust; and store ownership data including fractional ownership of the investor information based on the number of equity shares purchased by the investor in a block chain, wherein storing the ownership data comprises:

generating a private block for property title ownership data including a public key and a private key, wherein the public key is known both to the investor and the user, and wherein the private key is known only to the user, inserting, by the processor of the server, the private block for the property title ownership data in the block chain, generating, by the processor of the server, a new fractional property block for the fractional ownership of the investor information, changing, by the user using the private key, the fractional ownership of the investor information to a user information, and inserting the new fractional property block in the block chain.

* * * * *